United States Patent
Song

(10) Patent No.: US 11,500,513 B2
(45) Date of Patent: Nov. 15, 2022

(54) METHOD FOR ICON DISPLAY, TERMINAL, AND STORAGE MEDIUM

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/181,881

(22) Filed: Feb. 22, 2021

(65) Prior Publication Data

US 2021/0173550 A1 Jun. 10, 2021

Related U.S. Application Data

(63) Continuation of application No. PCT/CN2019/096393, filed on Jul. 17, 2019.

(30) Foreign Application Priority Data

Aug. 22, 2018 (CN) .......................... 201810961881.1

(51) Int. Cl.
*G06F 3/04817* (2022.01)
*G06F 3/0483* (2013.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC .............................. G06F 3/0483; G06F 3/0486
See application file for complete search history.

(56) References Cited

U.S. PATENT DOCUMENTS

| 7,702,409 B2 | 4/2010 | Lucas et al. |
| 2006/0149558 A1 | 7/2006 | Kahn et al. |

(Continued)

FOREIGN PATENT DOCUMENTS

| CN | 101042650 | 9/2007 |
| CN | 103475784 | 12/2013 |

(Continued)

OTHER PUBLICATIONS

EPO, Extended European Search Report for EP Application No. 19851559.5, dated Sep. 7, 2021.

(Continued)

*Primary Examiner* — Cesar B Paula
*Assistant Examiner* — Sajeda Muhebbullah
(74) *Attorney, Agent, or Firm* — Hodgson Russ LLP

(57) ABSTRACT

A method for icon display, a terminal, and a storage medium are provided, which relate to the technical filed of computers. According to the technical solutions of implementations, an attribute of a foreground application is acquired after receiving a sidebar display instruction. The number of rows and columns of icons in each of the at least two sub-regions is determined according to the attribute of the foreground application. At least one icon is displayed in each of the at least two sub-regions according to the number of rows and columns of icons in each of the at least two sub-regions.

18 Claims, 14 Drawing Sheets

(51) Int. Cl.
  *G06F 9/54* (2006.01)
  *G06F 3/0481* (2022.01)
  *G06F 3/0482* (2013.01)
  *G06F 3/04886* (2022.01)
  *G06F 3/0486* (2013.01)

(52) U.S. Cl.
  CPC .......... *G06F 3/0483* (2013.01); *G06F 3/0486* (2013.01); *G06F 3/04886* (2013.01); *G06F 9/54* (2013.01); *G06F 2203/04803* (2013.01)

(56) References Cited

U.S. PATENT DOCUMENTS

| | | | | |
|---|---|---|---|---|
| 2008/0084389 | A1* | 4/2008 | Mac | H04N 21/42206 345/158 |
| 2012/0120316 | A1* | 5/2012 | Lee | H04N 21/42204 348/564 |
| 2013/0227413 | A1* | 8/2013 | Thorsander | G06F 3/04886 715/716 |
| 2013/0326391 | A1 | 12/2013 | Chen et al. | |
| 2015/0186610 | A1* | 7/2015 | San | G16Z 99/00 715/736 |
| 2015/0333964 | A1* | 11/2015 | Wang | G06F 9/44 709/224 |
| 2015/0348493 | A1* | 12/2015 | Chae | G09G 5/00 345/212 |

FOREIGN PATENT DOCUMENTS

| | | |
|---|---|---|
| CN | 104035650 | 9/2014 |
| CN | 104035662 | 9/2014 |
| CN | 106547446 | 3/2017 |
| CN | 107704185 | 2/2018 |
| CN | 108008896 | 5/2018 |
| CN | 108111687 | 6/2018 |
| EP | 2113830 | 11/2009 |
| EP | 2682853 | 1/2014 |
| EP | 3355187 | 8/2018 |
| WO | 2018068328 | 4/2018 |

OTHER PUBLICATIONS

WIPO, ISR for PCT/CN2019/096393, Sep. 26, 2019.
SIPO, First Office Action for CN Application No. 201810961881.1, dated Nov. 25, 2019.
SIPO, Second Office Action for CN Application No. 201810961881.1, dated May 13, 2020.

* cited by examiner

METHOD FOR ICON DISPLAY, TERMINAL, AND STORAGE MEDIUM

CROSS-REFERENCE TO RELATED APPLICATION(S)

This application is a continuation of International Application No. PCT/CN2019/096393, filed on Jul. 17, 2019, which claims priority to Chinese Patent Application No. 201810961881.1, filed Aug. 22, 2018, the entire disclosures of which are hereby incorporated by reference.

TECHNICAL FIELD

This disclosure relates to the technical field of computers, in particularly to a method for icon display, a terminal, and a storage medium.

BACKGROUND

At present, when a foreground application is running on a terminal such as a mobile phone or a tablet computer, if a user needs to use a sidebar, generally, a sidebar with sub-regions of fixed sizes is displayed. As the sidebar is irrelevant to the foreground application, it may be inconvenient for the user to find a desirable icon from the sub-regions.

SUMMARY

According to an aspect, a method for icon display is provided. The method includes the following.

An attribute of a foreground application is acquired after receiving a sidebar display instruction, where the sidebar display instruction is used to instruct a terminal to display a sidebar on a current user interface, the sidebar includes at least two sub-regions, and the attribute of the foreground application includes a type of the foreground application or an application scene of the foreground application.

The number of rows and columns of icons in each of the at least two sub-regions is determined according to the attribute of the foreground application, where the number of rows and columns of icons is indicative of the number of rows and columns of at least one icon in one page of one sub-region.

At least one icon is displayed in each of the at least two sub-regions according to the number of rows and columns of icons in each of the at least two sub-regions.

According to another aspect, a terminal is provided. The terminal includes at least one processor and a non-transitory computer readable storage. The computer readable storage is coupled to the at least one processor and stores at least one computer executable instruction thereon which, when executed by the at least one processor, causes the at least one processor to execute the method of the first aspect.

According to still another aspect, a computer-readable storage medium is provided. The non-transitory computer readable storage medium is configured to store a computer program which, when executed by a processor, causes the processor to: acquire an attribute of a foreground application after receiving a sidebar display instruction, where the sidebar display instruction is used to instruct a terminal to display a sidebar on a current user interface, the sidebar includes at least two sub-regions, and the attribute of the foreground application includes a type of the foreground application or an application scene of the foreground application; determine, according to the attribute of the foreground application, the number of rows and columns of icons in each of the at least two sub-regions, where the number of rows and columns of icons is indicative of the number of rows and columns of at least one icon in one page of one sub-region; determine, according to the number of rows and columns of icons in each of the at least two sub-regions, the size of each of the at least two sub-regions in the sidebar; and display at least one icon in each of the at least two sub-regions.

DETAILED DESCRIPTION

Figure 1:
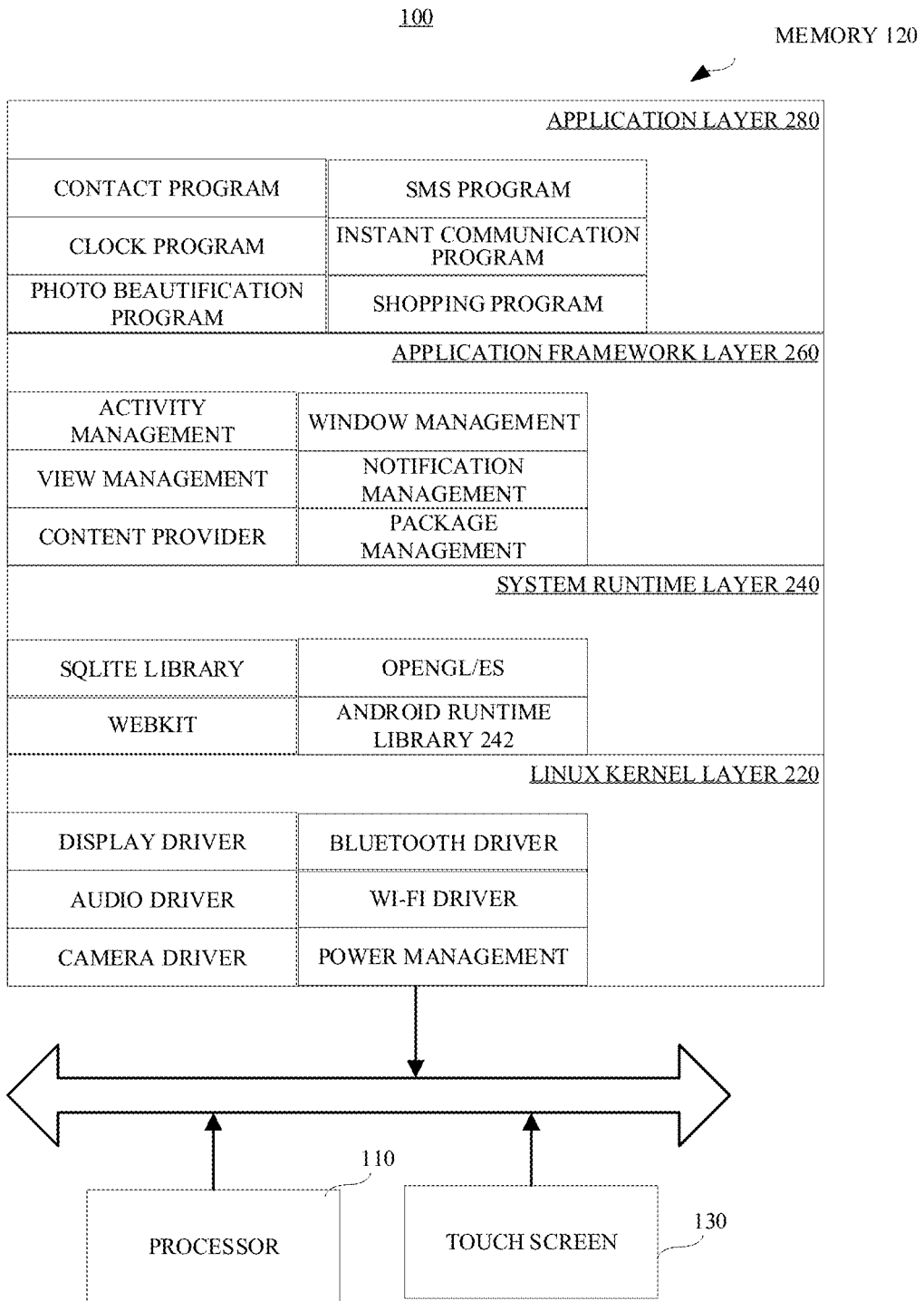
FIG. 1 is a structural schematic diagram illustrating a terminal 100 according to implementations.

To make objectives, technical solutions, and advantages of the present application more clear, implementations of the application will be described in further detail below with reference to the accompanying drawings.

According to implementations, an attribute of a foreground application is acquired after receiving a sidebar display instruction. The number of rows and columns of icons in each of at least two sub-regions is determined according to the attribute of the foreground application. At least one icon is displayed in each of the at least two sub-regions according to the number of rows and columns of icons in each of the at least two sub-regions. According to the implementation, the terminal can determine the number of rows and columns of icons in each sub-region according to the attribute of the foreground application. It is possible to display, in a sub-region that is used more frequently in relative to the foreground application, more icons and display, in a sub-region that is used less frequently in relative to the foreground application, fewer icons, which improves efficiency of using by a user in the designated foreground application a function corresponding to the icon.

In at least one implementation, a method for icon display includes the following.

An attribute of a foreground application is acquired after receiving a sidebar display instruction, where the sidebar display instruction is used to instruct a terminal to display a sidebar on a current user interface, the sidebar includes at least two sub-regions, and the attribute of the foreground application includes a type of the foreground application or an application scene of the foreground application.

The number of rows and columns of icons in each of the at least two sub-regions is determined according to the attribute of the foreground application, where the number of rows and columns of icons is indicative of the number of rows and columns of at least one icon in one page of one sub-region.

At least one icon is displayed in each of the at least two sub-regions according to the number of rows and columns of icons in each of the at least two sub-regions.

In at least one implementation, at least one icon is displayed in each of the at least two sub-regions according to the number of rows and columns of icons in each of the at least two sub-regions as follows.

For each sub-region, the size of the sub-region is determined according to the number of rows and columns of icons in the sub-region.

A position for displaying the sub-region in the sidebar is determined according to the size of the sub-region and a display order of the sub-region, where the display order is an order of displaying of the sub-region in the sidebar in relative to other sub-regions.

The sub-region is displayed at the position.

At least one icon is displayed in the sub-region.

In at least one implementation, the at least one icon is displayed in the sub-region as follows.

The at least one icon contained in a multi-page sub-region is determined when the sub-region is the multi-page sub-region, where the multi-page sub-region contains i pages and i is a positive integer greater than or equal to 2.

For each of the at least one icon contained in the multi-page sub-region, the number of previous use times or a previous use frequency thereof in the application scene is determined.

The at least one icon is arranged from the j-th page to the (j+1)-th page in the multi-page sub-region in a descending order of the numbers of previous use times or the previous use frequencies, where j is a positive integer and (j+1) is less than or equal to i.

In at least one implementation, when the attribute of the foreground application includes the application scene of the foreground application, the number of rows and columns of icons in each of the at least two sub-regions is determined according to the attribute of the foreground application as follows.

The number of previous page-turning times (or called the number of times of historical page-turning) or a previous page-turning frequency of a multi-page sub-region in the application scene is determined, when at least one of the at least two sub-regions is the multi-page sub-region. The number of rows and columns of icons in the multi-page sub-region is m1 rows and n1 columns and one page of a sub-region is displayed at a time.

A low-frequency sub-region is determined from the at least two sub-regions when the number of previous page-turning times is greater than a first threshold or the previous page-turning frequency is greater than a second threshold. The number of rows and columns of icons in the low-frequency sub-region is m2 rows and n2 columns.

The number of rows of icons in the multi-page sub-region is adjusted to (m1+p) and the number of rows of icons in the low frequency sub-region is adjusted to (m2−p) when the sidebar is displayed in a first mode and n1=n2. The first mode is a mode where the sidebar is displayed on a left or right side of the current user interface.

The number of columns of icons in the multi-page sub-region is adjusted to (n1+q) and the number of columns of icons in the low-frequency sub-region is adjusted to (n2−q) when the sidebar is displayed in a second mode and m1=m2. The second mode is a mode where the sidebar is displayed at the top or bottom of the current user interface.

m1, n1, m2, n2, p, and q are natural numbers, m2 is greater than or equal to p, and n2 is greater than or equal to q.

In at least one implementation, when the attribute of the foreground application includes the type of the foreground application, the attribute of the foreground application is acquired after receiving the sidebar display instruction as follows.

An application identifier of the foreground application is acquired after receiving the sidebar display instruction.

The type of the foreground application is determined according to the application identifier of the foreground application.

The number of rows and columns of icons in each of the at least two sub-regions is determined according to the attribute of the foreground application as follows.

The number of rows and columns of icons in each of the at least two sub-regions is determined according to the type of the foreground application.

In at least one implementation, when the attribute of the foreground application includes the application scene of the foreground application, the attribute of the foreground application is acquired after receiving the sidebar display instruction as follows.

An application identifier of the foreground application is acquired after receiving the sidebar display instruction.

The application scene of the foreground application is determined from a scene configuration file according to the application identifier of the foreground application, where the scene configuration file is preset in the terminal or downloaded from a server.

In at least one implementation, the application scene of the foreground application is determined from the scene configuration file according to the application identifier of the foreground application as follows.

An application running on a focus screen is determined as the foreground application when the terminal is in a split-screen mode.

The application scene of the foreground application is determined from the scene configuration file according to the application identifier of the foreground application.

In at least one implementation, the application scene of the foreground application is determined from the scene configuration file according to the application identifier of the foreground application as follows.

The number k of application scenes corresponding to the foreground application is determined according to the application identifier of the foreground application, where k is a positive integer.

The application scene corresponding to the foreground application is determined as the application scene of the foreground application, when k is equal to 1.

The application scene of the foreground application is determined according to a first application programming interface (API) invoked by the foreground application, when k is greater than or equal to 2.

In at least one implementation, the application scene of the foreground application is determined according to the first API invoked by the foreground application as follows.

An application scene corresponding to the first API is determined according to a scene mapping relationship, where the scene mapping relationship is indicative of a mapping relationship between APIs and application scenes.

The application scene corresponding to the first API is determined as the application scene of the foreground application.

Figure 2:
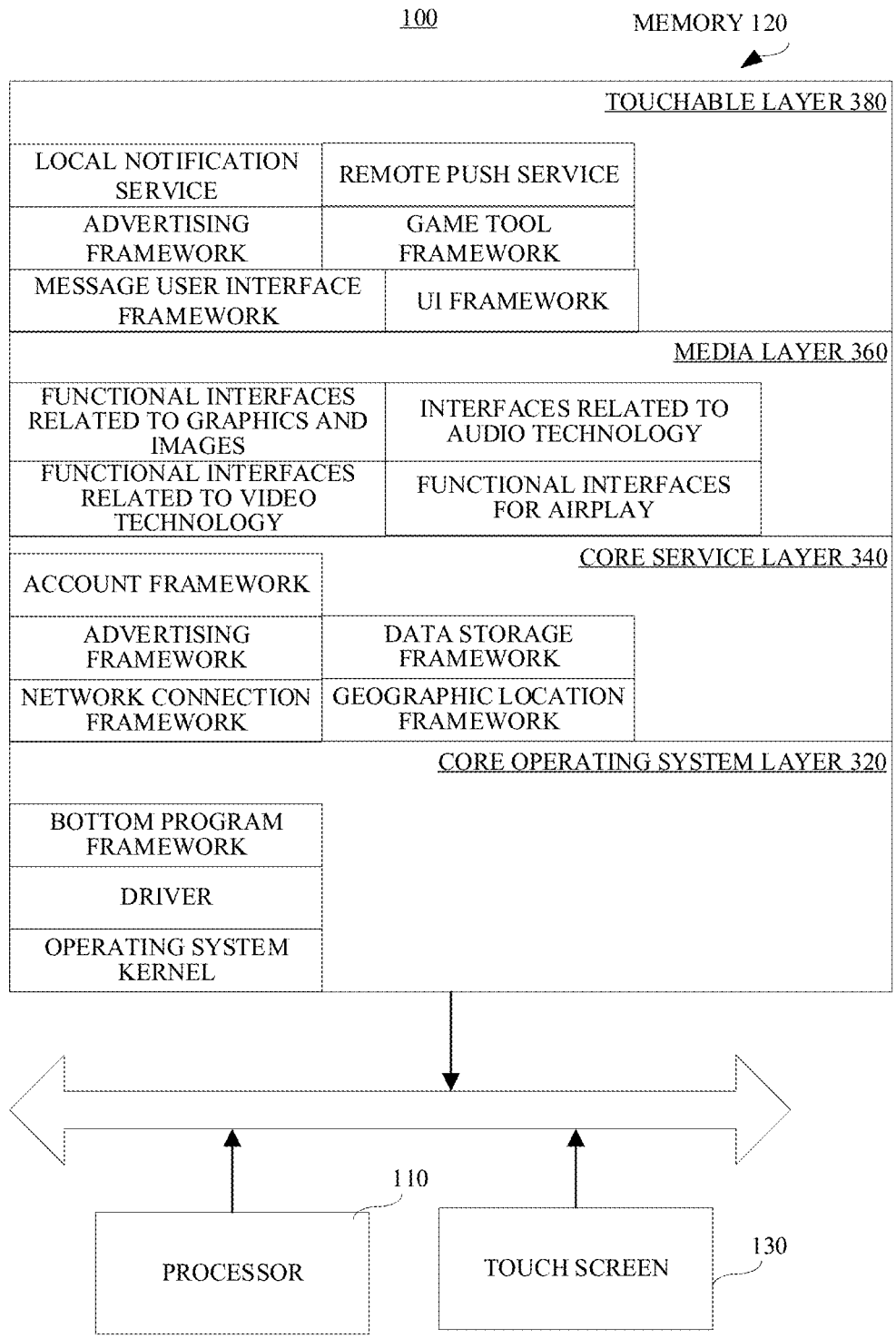
FIG. 2 is a structural schematic diagram illustrating a terminal 100 according to other implementations.

FIGS. 1 and 2 each illustrate a structural block diagram of a terminal 100 according to an example implementation. The terminal 100 may be a mobile phone, a tablet computer, a notebook computer, an e-book, or the like. The terminal 100 in the present disclosure may include one or more of the following components: a processor 110, a memory 120, and a touch screen 130.

The processor 110 may include one or more processing cores. The processor 110 is configured to connect various parts of the entire terminal 100 by using various interfaces and lines, execute or perform the instructions, programs, code sets, or instruction sets stored in the memory 120, and deploy the data stored in the memory 120, to execute various functions and processing data of terminal 100. In an example, the processor 110 may use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interface, and application programs; the GPU is responsible for rendering and drawing the content to be displayed by the touch screen 130; and the modem is used for processing wireless communication. It can be understood that the modem may not be integrated into the processor 110, and may be implemented by a single chip.

The memory 120 may include random access memory (RAM), and may also include read-only memory (ROM). In an example, the memory 120 includes a non-transitory computer-readable storage medium. The memory 120 may be used to store instructions, programs, codes, code sets, or instruction sets. The memory 120 may include a storage program region and a storage data region, where the storage program region may store instructions for implementing an operating system, instructions for at least one function (such as a touch function, a sound playback function, an image playback function, etc.), and instructions for use in implementing the following method implementations; the storage data region may store data (such as audio data, phone book) created according to the use of terminal 100.

Taking the operating system of an Android system as an example, the programs and data stored in the memory 120 are illustrated in FIG. 1. The memory 120 stores a Linux kernel layer 220, a system runtime layer 240, an application framework layer 260, and an application layer 280. The Linus kernel layer 220 provides underlying drivers for various hardware of the terminal 100, such as display drivers, audio drivers, camera drivers, Bluetooth drivers, Wi-Fi (wireless fidelity) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library 242 is also provided in the system runtime layer 240, which mainly provides some core libraries for allowing developers to write Android applications using the Java language. The application framework layer 260 provides various APIs that may be used when building application programs. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Taking the operating system of an IOS system as an example, the programs and data stored in the memory 120 are illustrated in FIG. 2. The IOS system includes: a core operating system layer 320, a core service layer 340, a media layer 360, and a touchable layer (also called Cocoa touch layer) 380. The core operating system layer 320 includes an operating system kernel, drivers, and underlying program frameworks. These underlying program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and Airplay interfaces for audio and video transmission technologies. The touchable layer 380 provides various commonly-used interface-related frameworks for application development. The touchable layer 380 is responsible for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 2, frameworks related to most applications include, but are not limited to: a basic framework in the core service layer 340 and a UIKit framework in the touchable layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch screen 130 is used for receiving a touch operation by a user using a finger, a touch pen, or any suitable object on or nearby, and a user interface displaying various applications. The touch screen 130 is usually disposed on the front panel of the terminal 100. The touch screen 130 may be designed as a full screen, a curved screen, or a special-shaped screen. The touch screen 130 can also be designed as a combination of a full screen and a curved screen, and a combination of a special-shaped screen and a curved screen, which is not limited herein.

Full Screen

Figure 3:
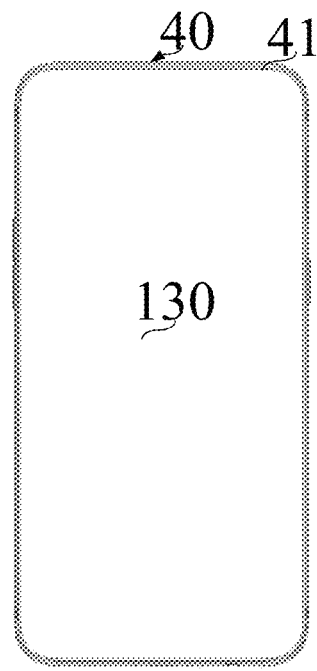
FIG. 3 is a schematic diagram illustrating a full screen according to implementations.

The full screen may refer to a screen design in which the touch screen 130 occupies the front panel of the terminal 100 with a screen ratio exceeding a threshold (such as 80% or 90% or 95%). One calculation method of the screen ratio is: (the area of the touch screen 130/the area of the front panel of the terminal 100)*100%; another way to calculate the screen ratio is: (the area of the actual display region in the touch screen 130/the area of the front panel of the terminal 100)*100%; yet another way to calculate the screen ratio is: (the diagonal of touch screen 130/the diagonal of the front panel of the terminal 100)*100%. In the schematic example illustrated in FIG. 3, almost all regions on the front panel of the terminal 100 are touch screen 130. On the front panel 40 of the terminal 100, all regions other than the edges generated by the middle frame 41 are all touch screen 130. The four corners of the touch screen 130 may be right-angled or rounded.

The full screen may also be a screen design in which at least one front panel component is integrated inside or below the touch screen 130. In an example, the at least one front panel component includes a camera, a fingerprint sensor, a proximity light sensor, a distance sensor, and the like. In some examples, other components on the front panel of the related terminal are integrated in all or part of the touch screen 130. For example, after the photosensitive element in the camera is split into multiple photosensitive pixels, the pixels are integrated in a black region in each display pixel in the touch screen 130. Since the at least one front panel component is integrated inside the touch screen 130, the full screen has a higher screen ratio.

In other examples, the front panel components on the front panel of the related terminal can also be set on the side or back of the terminal 100, such as placing an ultrasonic fingerprint sensor under the touch screen 130, or a bone-conducting earpiece inside the terminal 100, and the camera arranged on the side of the terminal in a pluggable structure.

In some examples, when the terminal 100 uses a full screen, a single side, or two sides (such as left and right sides), or four sides (such as top, bottom, left, and right sides) of the middle frame of the terminal 100 are provided with edge touch sensors. The edge touch sensors are used to detect at least one of a user's touch operation, click operation, press operation, and sliding operation on the middle frame. The edge touch sensor may be any one of a touch sensor, a thermal sensor, and a pressure sensor. The user can apply operations on the edge touch sensor to control applications in the terminal 100.

Curved Screen

Figure 4:
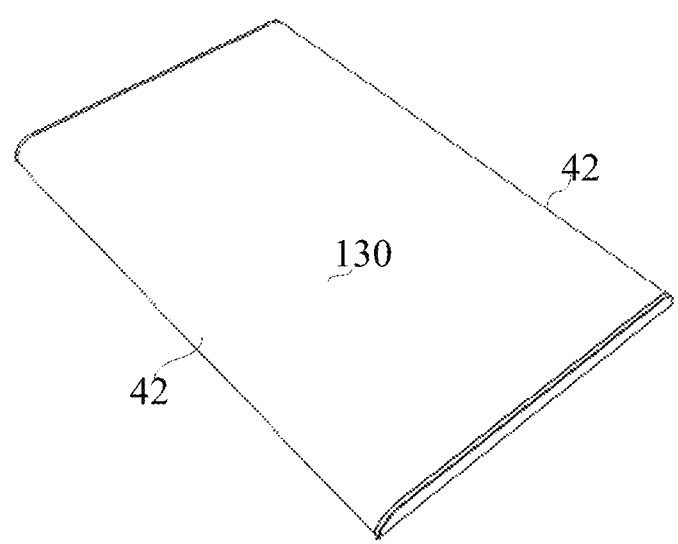
FIG. 4 is a schematic diagram illustrating a curved screen according to implementations.

The curved screen refers to a screen design in which the screen region (i.e., a region of the screen) of the touch screen 130 is not in a plane. Generally, a curved screen has at least one cross section: the cross section has a curved shape, and the projection of the curved screen in any plane direction perpendicular to the cross section is a flat screen design. The curved shape may be U-shaped. In an example, the curved screen refers to a screen design manner in which at least one side is a curved shape. In an example, the curved screen refers to that at least one side of the touch screen 130 extends to cover the middle frame of the terminal 100. Since the side of the touch screen 130 extends to cover the middle frame of the terminal 100, the middle frame without the display function and the touch function is also covered as a displayable region and/or an operable region, so that the curved screen has a higher screen ratio. In an example, in the example illustrated in FIG. 4, the curved screen refers to a screen design in which the left and right sides 42 are curved; or, the curved screen refers to a screen design in which the upper and lower sides are curved; or, curved screen refers to a screen design with four curved sides on the top, bottom, left, and right. In another example, the curved screen is made of a touch screen material with a certain flexibility.

Special-Shaped Screen

The special-shaped screen is a touch screen with an irregular shape. The irregular shape is not a rectangle or a rounded rectangle. In an example, the special-shaped screen refers to a screen design provided with protrusions, notches, and/or holes on the rectangular or rounded rectangular touch screen 130. In an example, the protrusion, the notch, and/or the hole can be located at the edge of the touch screen 130, the center of the screen, or both. When the protrusion, notch, and/or hole are set on one edge, they can be set at the middle position or both ends of the edge; when the protrusion, notch, and/or hole are set on the center of the screen, they can be set in one or more of the regions: the upper region, the upper left region, the left region, the lower left region, the lower region, the lower right region, the right region, and the upper right region of the screen. When arranged in multiple regions, the protrusions, the notches, and the holes can be distributed in a centralized or distributed manner; they can be distributed symmetrically or asymmetrically. The number of the protrusions, the notches, and/or the holes is not limited.

Because the special-shaped screen covers the upper and/or lower forehead region of the touch screen as a displayable region and/or an operable region, so that the touch-screen display takes up more space on the front panel of the terminal, having a larger screen ratio. In some examples, the notches and/or holes are used to receive at least one front panel component, which includes at least one of a camera, a fingerprint sensor, a proximity light sensor, a distance sensor, handset, an ambient light sensor, or physical buttons.

Figure 5:
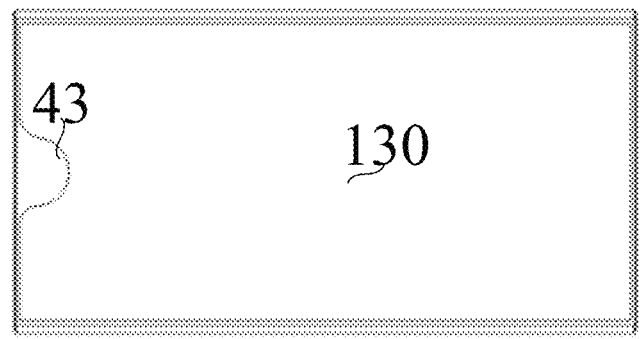
FIG. 5 is a schematic diagram illustrating a special-shaped screen according to implementations.
Figure 6:
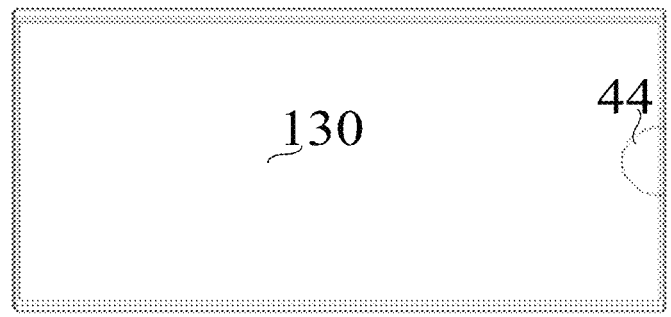
FIG. 6 is a schematic diagram illustrating a special-shaped screen according to other implementations.
Figure 7:
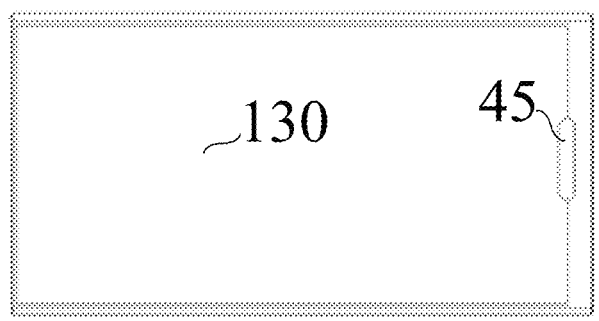
FIG. 7 is a schematic diagram illustrating a hole-in-screen screen according to implementations.
Figure 8:
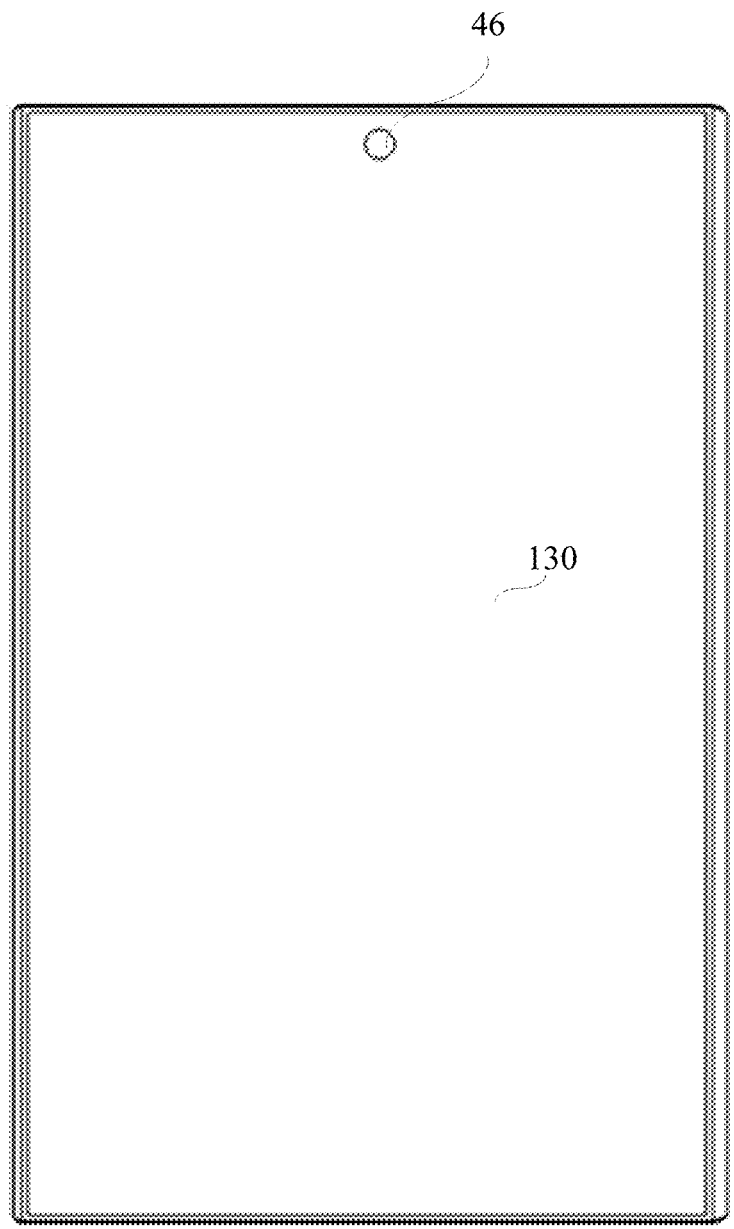
FIG. 8 is a schematic diagram illustrating a hole-in-screen screen according to other implementations.

Schematically, the notch may be provided on one or more edges, and the notch may be a semi-circular notch, a right-angled rectangular notch, a rounded rectangular notch, or an irregularly-shaped notch. In the example illustrated schematically in FIG. 5, the special-shaped screen may be a screen design provided with a semi-circular notch 43 at the center of the upper edge of the touch screen 130. The space vacated by the semi-circular notch 43 is used for accommodating at least one front panel component of a camera, a distance sensor (also known as a proximity sensor), a handset, and an ambient light brightness sensor. As illustrated in FIG. 6, the special-shaped screen may be designed that a semi-circular notch 44 is located on the central position of the lower edge of the touch screen 130. The space vacated by the semi-circular notch 44 is used to accommodate at least one component of a physical button, a fingerprint sensor, and a microphone. As illustrated in the example of FIG. 7, the special-shaped screen may be a screen design provided with a semi-elliptical notch 45 in the center of the lower edge of the touch screen 130. A semi-elliptical notch is formed on the front panel of the terminal 100, and two semi-elliptical notches surround to form an elliptical region. The elliptical region is used to accommodate physical keys or fingerprint recognition modules. In an example, the screen illustrated in FIG. 7 is also called a hole-in-screen screen. In the example illustrated in FIG. 8, the shaped screen can be a screen design having at least one small hole 46 in the upper half of the touch screen 130, and the space vacated by the small hole 46 is used to accommodate at least one front panel component of a camera, a distance sensor, a handset, and an ambient light sensor.

Figure 9:
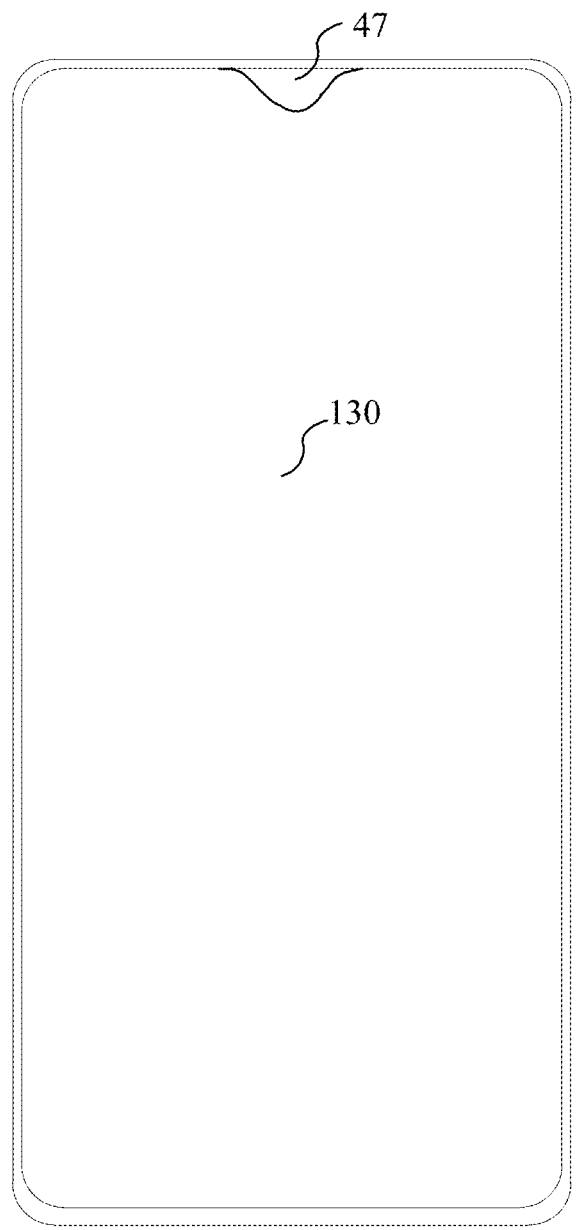
FIG. 9 is a schematic diagram illustrating a drop-shaped bang screen according to implementations.

In one example, the screen with the notch is called a bang screen. FIG. 9 illustrates a drop-shaped bang screen. The drop-shaped notch 47 occupies a smaller screen region than other shapes of notches, which helps to increase the screen-to-body ratio. The drop-shaped notch 47 is located at the edge of the touch screen 130. In an example, the screen-to-body ratio of a terminal with a drop-shaped bang screen can be increased to 91.5%.

In addition, those skilled in the art can understand that the structure of the terminal 100 illustrated in the above figures does not constitute a limitation on the terminal 100. The terminal may include more or fewer components than illustrated in the drawings, or combine certain components, or different component arrangements. For example, the terminal 100 further includes components such as a radio frequency circuit, an input unit, a sensor, an audio circuit, a Wi-Fi module, a power supply, and a Bluetooth module, and details are not repeated herein.

In order to facilitate understanding of the solutions of the implementations of this application, several terms used will be introduced below.

The "sidebar" refers to a virtual column-shaped region displayed close to the side of the terminal, and in the virtual column-shaped area, icons are displayed. In practice, the sidebar can be called a smart sidebar, a function extension bar, or a control bar, etc., which is not limited herein.

It should be noted that, sides refer to the edges where the top side intersects with the bottom side of a display screen.

Figure 10:
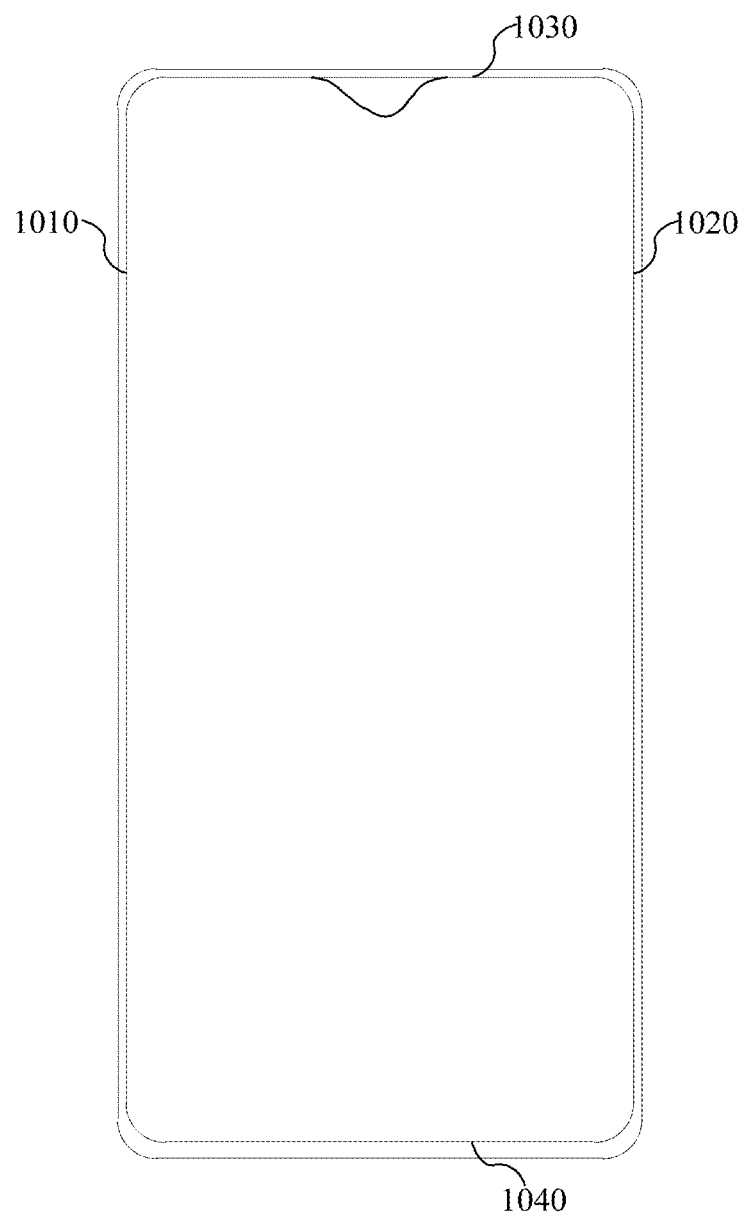
FIG. 10 is a schematic diagram illustrating a side of a screen according to implementation.

In an example, FIG. 10 is a schematic diagram illustrating a side of a screen according to implementation. As illustrated in FIG. 10, the display screen is in a portrait state, and in this case, the long side 1010 and the long side 1020 are sides, the short side 1030 is the top side, and the short side 1040 is the bottom side.

Figure 11:
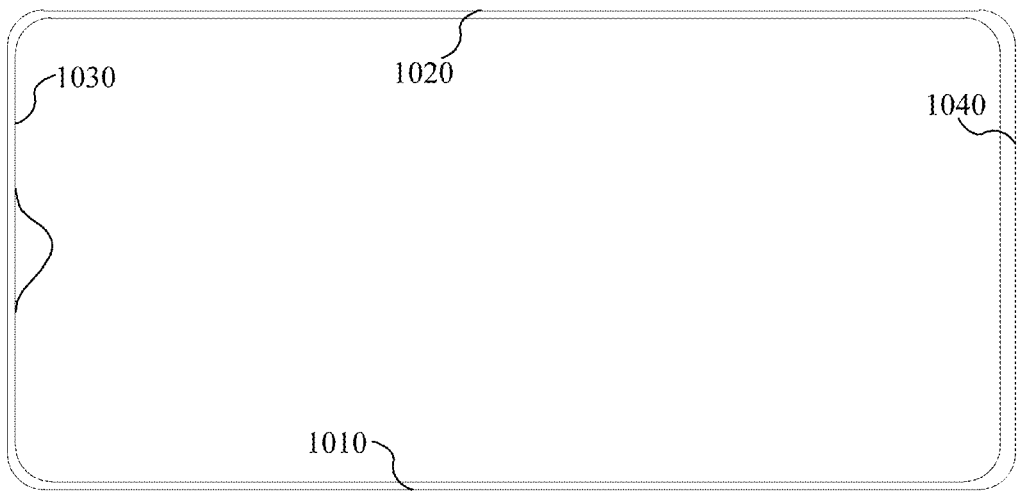
FIG. 11 is a schematic diagram illustrating a side of a screen according to other implementations.

In another example, FIG. 11 is a schematic diagram illustrating a side of a screen according to other implementations. As illustrated in FIG. 11, the display screen is in a landscape state, and in this case, the short side 1030 and the short side 1040 are sides, the long side 1020 is the top side, and the long side 1010 is the bottom side.

Figure 12:
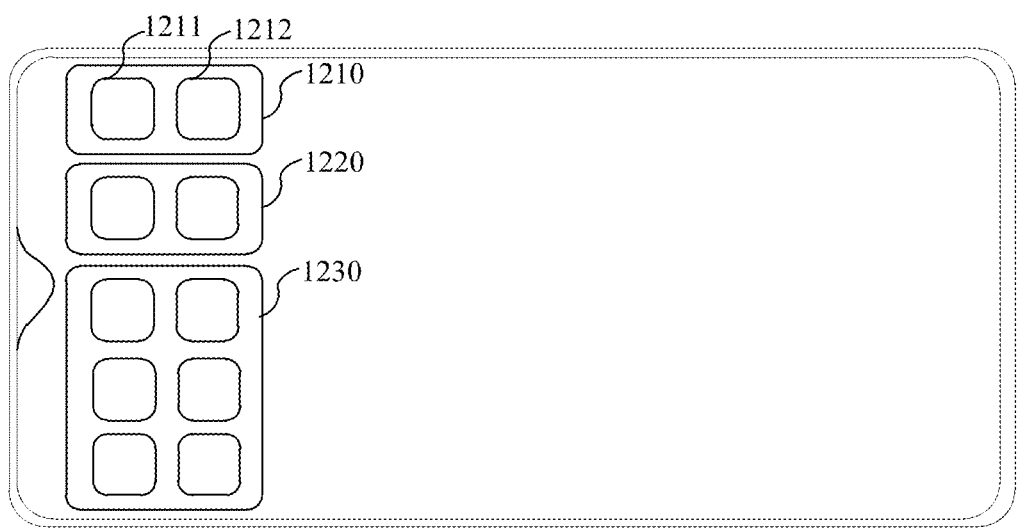
FIG. 12 is a schematic diagram illustrating a side of a screen according to other implementations.

In an implementation manner, the sidebar includes at least two sub-regions. In this implementation manner, the sidebar may include multiple controls of different categories. FIG. 12 is a schematic diagram illustrating a side of a screen according to other implementations. As illustrated in FIG. 12, the sidebar 1200 includes a first sub-region 1210, a second sub-region 1220, and a third sub-region 1230. The controls in each sub-region are displayed in the form of icons.

(1) The first sub-region 1210 is used to place important function controls provided by the system such as a shorthand function control 1211, a file desk function control 1212, and the like. In an example, to avoid change to these important function controls due to unintended operation of a user, the terminal may fix the first sub-region 1210, so that the controls displayed in the first sub-region 1210 will not be changed, that is, the icons displayed in the first sub-region 1210 will not be changed. In an example, the first sub-region 1210 may also be called a fixed functional region.

The controls displayed in the first sub-region 1210 are for illustration rather than to limit this application.

(2) The second sub-region 1220 is used to place shortcut function controls, where a shortcut function may be a system service provided by an operating system or an application service provided by a third-party application. In an example, the second sub-region 1220 may also be called a shortcut tool region.

In the case that the shortcut function is the system service provided by the operating system, the system service may be a shortcut function such as a screenshot function, a screen recording function, a translation function, a voice assistant function, and an accelerated cleaning function.

In the case that the shortcut function is the application service provided by the third-party application, the application service may be a function of the third-party application. For example, a code-scanning function of a payment application, a code-scanning function of a social application, a car search function of a car-hailing application to view the location of the car in the current order, or a locating function of a takeaway application to view the location of the person delivering the takeaway.

The shortcut function controls displayed in the second sub-region 1220 are for illustration rather than to limit this application.

In an implementation manner, the second sub-region 1220 may be an empty bar, that is, an icon displayed in the second sub-region 1220 may be an adding control. When the adding control is clicked and triggered, the terminal will add other icons to the second sub-region 1220. In an implementation manner, the number of rows and columns of icons in one page of the second sub-region 1220 is 1 row and 2 columns, that is, the terminal displays (1×2) icons in the second sub-region 1220. When the number of icons to be displayed exceeds the number of icons that one page of the second sub-region 1220 can accommodate, the terminal will further display icons in other pages of the second sub-region 1220. For example, when there are 4 icons in the second sub-region 1220 that need to be displayed, the terminal displays a first icon and a second icon in a first page of the second sub-region 1220 and displays a third icon and a fourth icon in a second page of the second sub-region 1220.

(3) The third sub-region 1230 is used to place startup icons of third-party applications. In an example, the third sub-region may also be called a shortcut application region.

In an implementation manner, the number of rows and columns of icons in one page of the third sub-region 1230 is 3 rows and 2 columns, that is, in one page of the third sub-region 1230, 6 icons can be displayed.

In an implementation manner, the third sub-region 1230 may be an empty bar, that is, an icon displayed in the third sub-region 1230 may be an adding control. When the adding control is clicked and triggered, the terminal will add other icons to the third sub-region 1230.

In an implementation manner, the third sub-region 1230 is used to display startup icons of third-party applications, where a floating window logo can be displayed in a corner of the startup icon and the floating window logo can be displayed simultaneously with a corner mark of the third-party application. For example, if the corner mark of the third-party application is displayed in the upper right corner of the startup icon, the floating window logo can be displayed in any one of the lower right corner, upper left corner, and lower left corner of the startup icon.

In an implementation manner, if there are unread messages in the third-party application, the number of unread messages is displayed in the corner mark of the startup icon of the third-party application.

In an implementation manner, if the icon is an icon of a clone application of a designated third-party application, the name directly below the icon can be used to indicate that the application is a clone application.

In an implementation manner, if the icon is an icon of a quick application of the third-party application, the icon may be represented by a gray scale that is different from the startup icon of the third-party application. In an example, a mark of the quick application is also displayed in one of the unoccupied corners of the icon of the quick application.

It should be noted that, in display screens such as a special-shaped screen, a rectangular screen, a rounded rectangular screen, or an elliptical screen, the side refers to the edge of the display screen that is close to the left edge or right edge of a user interface. The special-shaped screen may include a bang screen, where the bang screen includes a rectangular groove bang screen, a rounded rectangular groove bang screen, a semicircular groove bang screen, or a rounded groove bang screen. The rounded groove bang screen can also be called a drop-shaped bang screen.

The "sidebar display instruction" is used to instruct the terminal to display the sidebar on a current user interface.

In an implementation manner, the sidebar display instruction may be an instruction generated when a trigger operation of the user is received. For example, when the terminal is in the landscape state, the terminal can generate the sidebar display instruction when the user slides from the outside of the side to the inside of the screen. Alternatively, when the terminal is in the landscape state, the sidebar display instruction can also be generated when the user presses a region where a front camera is located for a long time. Alternatively, when the terminal is in the portrait state, the terminal can also generate the sidebar display instruction when the user slides from the outside of the side to the inside of the screen.

In another implementation manner, the sidebar display instruction may be an instruction generated when the terminal switches to a designated state. For example, when the terminal switches from the portrait state to the landscape state, if the terminal does not display the sidebar at this time, the sidebar display instruction will be generated. For another example, when a video playback software switches from a window playback mode to a full-screen playback mode, if the terminal does not display the sidebar at this time, the sidebar display instruction will be generated.

In another implementation manner, the sidebar display instruction may be an instruction generated when the terminal receives environmental sensor information. For example, when the terminal detects that an ambient light intensity is higher than a threshold, the terminal generates the sidebar display instruction. Alternatively, when the terminal detects that the ambient light intensity is lower than the threshold, the terminal generates the sidebar display instruction. Alternatively, when the terminal detects the designated voice information, the terminal generates the sidebar display instruction.

The attribute of the foreground application includes a type of the foreground application or an application scene of the foreground application.

In an example, the type of the foreground application includes a use type of the application, including at least one of a camera type, a game type, a shopping type, an instant messaging type, a blog type, a drawing type, a text editing type, a booking type, a map navigation type, a video playback type, a live broadcast type, a browser type, a reading type, a music type, a payment type, a photo beautification type, a smart device control type, a phone type, a text message type, a weather type, a clock type, a system search type, a contact type, a shared traffic type, a logistics type, a taxi type, a takeaway type, an attendance check-in type, and a code-scanning type.

The application scene of the foreground application refers to a current application scene of the foreground application in the terminal. In the terminal, one application may correspond to one application scene or correspond to two or more application scenes.

In an implementation manner, the terminal determines the number k of application scenes corresponding to the foreground application according to an application identifier of the foreground application, where k is a positive integer. When k is equal to 1, the application scene corresponding to the foreground application is determined as the application scene of the foreground application. When k is not less than 2, the application scene of the foreground application is determined according to a first API invoked by the foreground application.

For example, as illustrated in Table 1, an application scene corresponding to news reading application A is a text reading scene; an application scene corresponding to news reading application B is at least one of a text reading scene, a picture viewing scene, and a video playback scene.

TABLE 1

|  | text reading scene | picture viewing scene | video playback scene |
| --- | --- | --- | --- |
| news reading application A | yes | no | no |
| news reading application B | yes | yes | yes |

In Table 1, the terminal pre-stores the application scene corresponding to news reading application A, that is, the text reading scene, and the application scene corresponding to news reading application B, that is, the text reading scene, the picture viewing scene, and the video playback scene.

When the foreground application is news reading application A, the terminal can obtain an application identifier of news reading application A. For example, the terminal can obtain an installation package name of news reading application A and determine the installation package name as the application identifier of news reading application A. The terminal determines that the number k of application scenes corresponding to news reading application A is 1, and then determines the text reading scene as the application scene of news reading application A.

When the foreground application is news reading application B, the terminal can obtain an application identifier of news reading application B. According to an installation package name of news reading application B, the terminal determines that the number k of application scenes corresponding to news reading application B is 3, which is not less than 2. As such, the terminal determines the application scene of the foreground application according to the first API invoked by the foreground application. In this case, there is a correspondence between first APIs and application scenes of the foreground application and the terminal will determine the application scene of the foreground application according to the first API invoked by the foreground application.

In at least one implementation, the terminal may determine an application scene corresponding to the first API according to a scene mapping relationship, where the scene mapping relationship is indicative of a mapping relationship between APIs and application scenes, and determine the application scene corresponding to the first API as the application scene of the foreground application.

For example, Table 2 illustrates the mapping relationship between APIs and application scenes.

TABLE 2

| API for video playback | API for picture rendering | API for game optimization |
|---|---|---|
| video playback scene | picture viewing scene | game battle scene |

Figure 13:
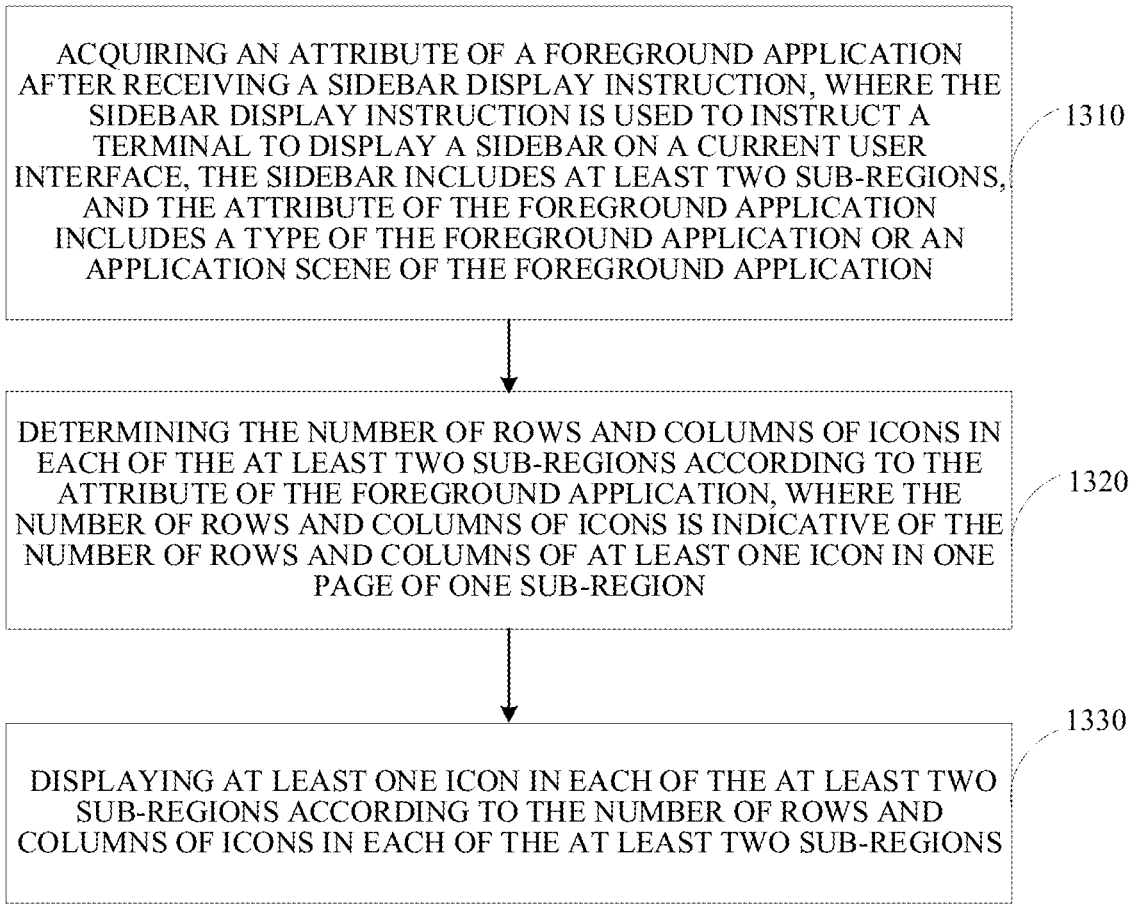
FIG. 13 is a schematic diagram illustrating a method for icon display according to implementation.

FIG. 13 is a schematic diagram illustrating a method for icon display according to implementation. The method can be applied to the terminal of any of FIG. 1 to FIG. 9. As illustrated in FIG. 13, the method begins at 1310.

At block 1310, an attribute of a foreground application is acquired after receiving a sidebar display instruction, where the sidebar display instruction is used to instruct a terminal to display a sidebar on a current user interface, the sidebar includes at least two sub-regions, and the attribute of the foreground application includes a type of the foreground application or an application scene of the foreground application.

In one implementation manner, when receiving the sidebar display instruction, the terminal obtains the type of the foreground application.

In another implementation manner, when receiving the sidebar display instruction, the terminal obtains the application scene of the foreground application. For example, if an operating system carried in the terminal is the Android system, the terminal can obtain from a stack of running applications an application package name at the top of the stack, where the application package name at the top of the stack is a package name of the foreground application. After the terminal obtains an application identifier (i.e., package name) of the foreground application, the terminal can determine the application scene of the foreground application according to the application identifier. For different function designs and architectures of terminals, different ways are applied to determine the application scene of the foreground application.

In one example, the foreground application corresponds to only one application scene. In this case, after obtaining the application identifier of the foreground application, the terminal determines the application scene corresponding to the foreground application as the application scene of the foreground application.

In another example, the foreground application corresponds to at least two application scenes. In this case, the terminal can determine the application scene of the foreground application through an API currently invoked by the foreground application. For example, when the foreground application invokes an API for video playback, it is determined that the foreground application is in a video playback scene; when the foreground application invokes an API for game optimization, it is determined that the foreground application is in a game battle scene.

It should be noted that the sidebar that the terminal needs to display includes at least two sub-regions and the sidebar display instruction is used to instruct the terminal to display the sidebar.

At block 1320, the number of rows and columns of icons in each of the at least two sub-regions is determined according to the attribute of the foreground application, where the number of rows and columns of icons is indicative of the number of rows and columns of at least one icon in one page of one sub-region.

In an implementation manner, the terminal can determine the number of rows and columns of icons in each of the at least two sub-regions according to the type of foreground application.

In another implementation manner, the terminal can determine the number of rows and columns of icons in each of the at least two sub-regions according to the application scene of the foreground application. In the sidebar, each sub-region has its own number of rows and columns of icons. For example, the sidebar includes a first sub-region, a second sub-region, and a third sub-region, where on one page of the first sub-region, the number of rows and columns of icons is 1 and 2 (i.e., 1 row and 2 columns), on one page of the second sub-region, the number of rows and columns of icons is 2 and 2 (i.e., 2 rows and 2 columns), on one page of the third sub-region, the number of rows and columns of icons is 3 and 2 (i.e., 3 rows and 2 columns).

In an example, in the same sub-region, the numbers of rows and columns of icons on different pages can be equal.

At block 1330, at least one icon is displayed in each of the at least two sub-regions according to the number of rows and columns of icons in each of the at least two sub-regions.

According to the implementation, the terminal can determine a display region of each sub-region according to the number of rows and columns of icons in each sub-region in the sidebar. After displaying the corresponding sub-regions in the designated display regions, the terminal will display at least one icon in each sub-region.

In an implementation manner, the terminal will determine a display region of the sub-region on the screen according to the number of rows and columns of icons in each sub-region in the sidebar. When the terminal displays on the screen the sub-region, at least one icon is displayed in the sub-region.

According to the implementation, the attribute of the foreground application is acquired after receiving the sidebar display instruction. The number of rows and columns of icons in each of the at least two sub-regions is determined according to the attribute of the foreground application. At least one icon is displayed in each of the at least two sub-regions according to the number of rows and columns of icons in each of the at least two sub-regions. Therefore, in the implementation, the terminal can determine the number of rows and columns of icons in each sub-region according to the attribute of the foreground application. It is possible to display, in a sub-region that is used more frequently in relative to the foreground application, more icons and display, in a sub-region that is used less frequently in relative to the foreground application, fewer icons, which improves efficiency of using by a user in the designated foreground application a function corresponding to the icon.

Based on the previous implementation, it is also possible to automatically adjust arrangement of icons in each sub-region according to use of icons. Reference can be made to the following implementation.

Figure 14:
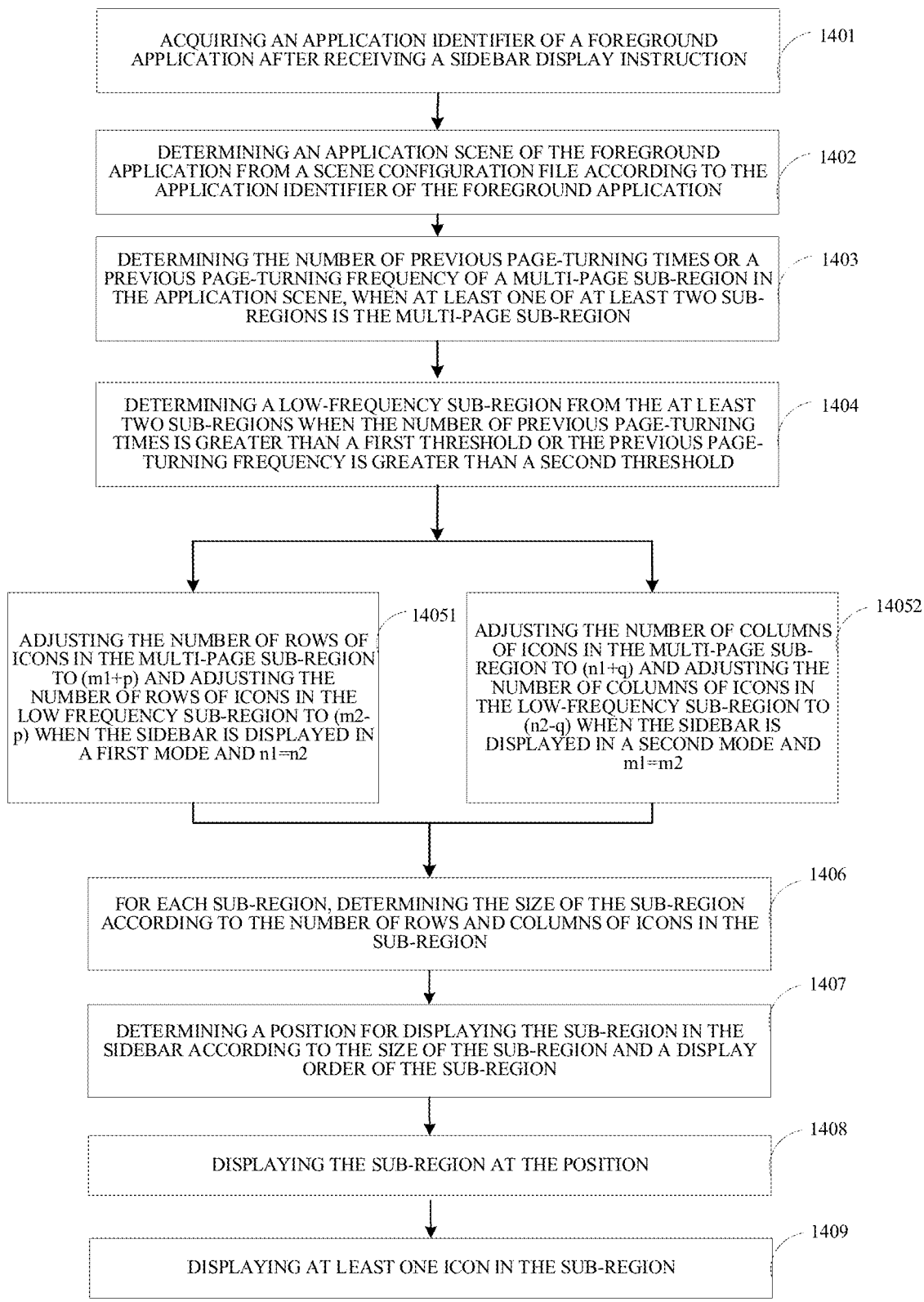
FIG. 14 is a schematic diagram illustrating a method for icon display according to other implementations.

FIG. 14 is a schematic diagram illustrating a method for icon display according to other implementations. The method can be applied to the terminal of any of FIG. 1 to FIG. 9. As illustrated in FIG. 14, the method begins at 1401.

At block 1401, an application identifier of a foreground application is acquired after receiving a sidebar display instruction.

In the implementation, when receiving the sidebar display instruction, the terminal can acquire the application identifier of the foreground application. For example, if an operating system carried in the terminal is the Android system, the terminal can obtain from a stack of running applications an application package name at the top of the stack, where the application package name at the top of the stack is a package name of the foreground application. After the terminal obtains an application identifier (i.e., package name) of the foreground application, the terminal can determine the application scene of the foreground application according to the application identifier. For different function designs and architectures of terminals, different ways are applied to determine the application scene of the foreground application.

At block 1402, an application scene of the foreground application is determined from a scene configuration file according to the application identifier of the foreground application.

In at least one implementation, the scene configuration file is preset in a terminal or downloaded from a server. The terminal can query a correspondence between application identifiers and application scenes from the scene configuration file according to the application identifier of the foreground application, and determine the application scene of the foreground application according to the correspondence.

In the implementation, the terminal can determine the number k of application scenes corresponding to the foreground application according to the application identifier of the foreground application, where k is a positive integer.

In the case that k is equal to 1, the application scene corresponding to the foreground application is determined as the application scene of the foreground application.

In the case that k is greater than or equal to 2, the application scene of the foreground application is determined according to a first API invoked by the foreground application.

In at least one implementation, when invoking a first API, the terminal determines an application scene corresponding to the first API according to a scene mapping relationship, where the scene mapping relationship is indicative of a mapping relationship between APIs and application scenes. Thereafter, the terminal determines the application scene corresponding to the first API as the application scene of the foreground application.

For example, when the foreground application invokes an API for video playback, it is determined that the foreground application is in a video playback scene; when the foreground application invokes an API for game optimization, it is determined that the foreground application is in a game battle scene.

In at least one implementation, when the terminal is in a split-screen mode, the terminal determines an application running on a focus screen as the foreground application. The terminal determines the application scene of the foreground application from the scene configuration file according to the application identifier of the foreground application.

When the terminal is in the split screen mode, in multiple sub-screens, there is a focus screen where the focus is currently located. The focus screen can be a screen that the user is interested in or is operating on, which is generally highlighted or in bold. In this case, the terminal determines the application running on the focus screen as the foreground application.

In an example, the terminal can also display at least one icon in a region other than the focus screen. When the terminal is in the split-screen mode, each sub-screen has limited area for display, where the focus screen requires more area for display. In this case, the terminal can display at least one icon in a display region other than the focus screen.

At block 1403, the number of previous page-turning times or a previous page-turning frequency of a multi-page sub-region in the application scene is determined, when at least one of at least two sub-regions is the multi-page sub-region.

In the implementation, the sub-region in the sidebar contains one page or at least two pages. When the sub-region in the sidebar contains one page, the sub-region can be called a single-page sub-region. When the sub-region in the sidebar contains at least two pages, the sub-region can be called a multi-page sub-region. The multi-page sub-region is a sub-region containing at least two pages and the number of rows and columns of icons in the multi-page sub-region includes m1 rows and n1 columns, where one sub-region displays one page at a time.

When there is a multi-page sub-region in the sidebar, the terminal can determine the number of previous page-turning times or previous page-turning frequency of the multi-page sub-region.

In one implementation manner, the terminal directly counts the number of previous page-turning times or previous page-turning frequency of the multi-page sub-region. For example, the multi-page sub-region contains three pages: a first page, a second page, and a third page. In this implementation manner, the terminal counts the number of times t1 of switching from the first page to the second page, the number of times t2 of switching from the second page to the third page, the number of times t3 of switching from the third page to the second page, and the number of times t4 of switching from the second page to the first page, so as to obtain the number of previous page-turning times of the multi-page sub-region: (t1+t2+t3+t4). In an example, when the multi-page sub-region supports cyclic switching of pages, that is, when the last page of the multi-page sub-region can be directly switched to the first page of the multi-page sub-region, based on the above, the terminal can further count the number of times t5 of switching from the third page to the first page, so as to obtain the number of previous page-turning times: (t1+t2+t3+t4+t5). The previous page-turning frequency can be the number of previous page-turning times within a designated time. For example, within 10 minutes, within 1 hour, within 1 day, or within 30 days, etc.

In another implementation manner, the terminal counts the number of previous page-turning times or previous page-turning frequency according to an application scene corresponding to the sidebar. For example, for an application scene, the terminal will count the number of previous page-turning times or previous page-turning frequency of the multi-page sub-region in that scene.

At block 1404, a low-frequency sub-region is determined from the at least two sub-regions when the number of previous page-turning times is greater than a first threshold or the previous page-turning frequency is greater than a second threshold.

The terminal can analyze the number of previous page-turning times or previous page-turning frequency. The low-frequency sub-region can be a sub-region in which the icons are triggered for the least number of times or triggered at the lowest frequency. The frequency at which the icons in this sub-region are triggered is a ratio of the total number of times that the icons in this sub-region are triggered to a designated time period.

In an example, the first threshold may be a threshold of the number of times pre-stored in the terminal, for example an integer value such as 300, 500, or 1000.

In an example, the second threshold may be a threshold of frequency pre-stored in the terminal, for example, 3 times per minute, 50 times per hour, 160 times per day, or the like.

In at least one implementation, the number of rows and columns of icons in the low-frequency sub-region is m2 rows and n2 columns. For example, m2 is 1, 2, or 3, and n2 can is 1, 2, or 3.

In the implementation, block 14051 or block 14052 can be performed by the terminal.

At block 14051, the number of rows of icons in the multi-page sub-region is adjusted to (m1+p) and the number of rows of icons in the low frequency sub-region is adjusted to (m2−p) when the sidebar is displayed in a first mode and n1=n2.

In the implementation, the first mode is a mode where the sidebar is displayed on a left side or right side of the current user interface.

Figure 15:
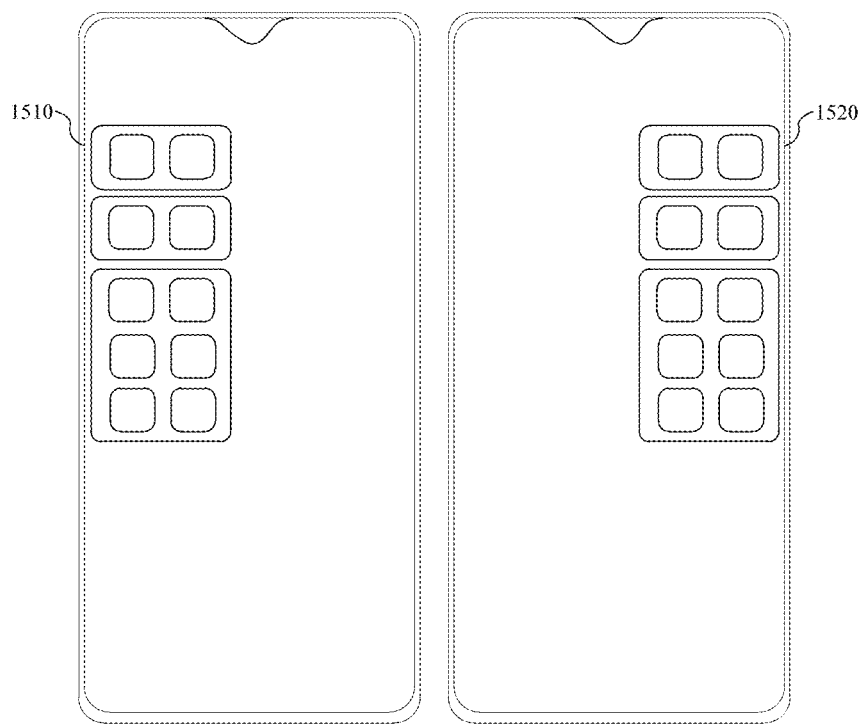
FIG. 15 is a schematic diagram illustrating display of a sidebar when a terminal is in a portrait state according to implementations of FIG. 14.

Based on the implementation illustrated in FIG. 14, FIG. 15 is a schematic diagram illustrating display of a sidebar when a terminal is in a portrait state according to implementations. In FIG. 15, the terminal is displayed in the portrait state, and the sidebar is displayed at a left edge 1510 of the screen or displayed at a right edge 1520 of the screen.

Figure 16:
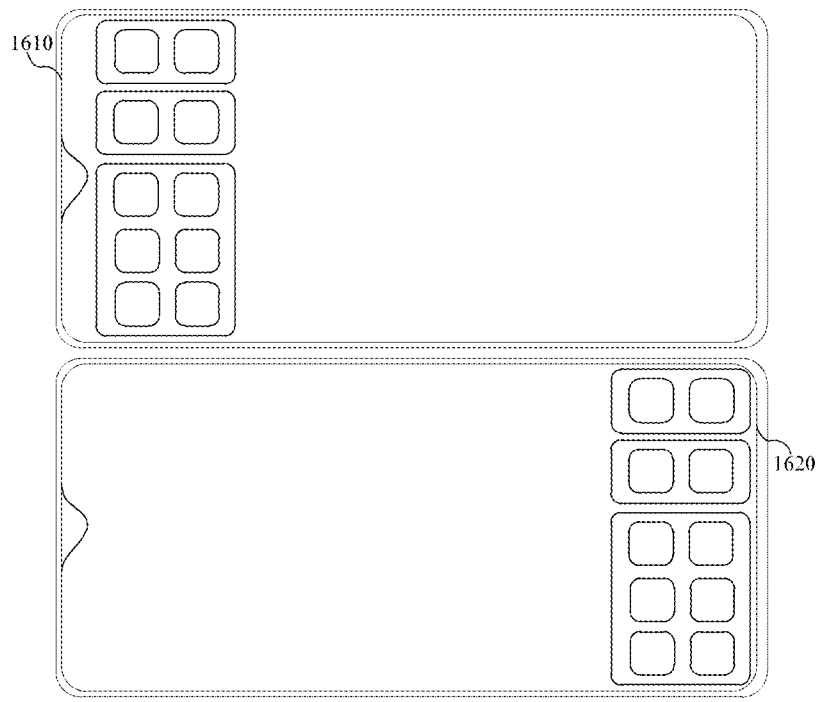
FIG. 16 is a schematic diagram illustrating display of a sidebar when a terminal is in a landscape state according to implementations of FIG. 14.

Based on the implementation illustrated in FIG. 14, FIG. 16 is a schematic diagram illustrating display of a sidebar when a terminal is in a landscape state according to implementations. In FIG. 16, the terminal is displayed in the landscape state, and the sidebar is displayed at a left edge 1610 of the screen or displayed at a right edge 1620 of the screen.

Taking the sidebar illustrated in FIG. 16 as an example, in the implementation, the number of rows and columns of icons in each sub-region can be determined according to the application scene of the foreground application. Furthermore, the number of rows and columns of icons in each sub-region in the sidebar corresponding to one application scene can be adjusted. In an example, the number of rows and columns of icons in each sub-region in the sidebar corresponding to one application scene is adjusted when the terminal starts this application scene.

For example, there are three sub-regions in the sidebar: sub-region z1, sub-region z2, and sub-region z3. In the video playback scene, the number of rows and columns of icons in sub-region z1 is 1 row and 2 columns; the number of rows and columns of icons in sub-region z2 is 2 rows and 2 columns; the number of rows and columns of icons in sub-region z3 is 2 rows and 2 columns. In an example, when the foreground application of the terminal starts a video playback scene, the terminal will display the sidebar according to the number of rows and columns of icons in each sub-region corresponding to the video playback scene.

Based on the above, before determining the number of rows and columns of icons in each sub-region corresponding to the video playback scene, the terminal can make decisions based on the multi-page sub-region and the low-frequency sub-region in the sidebar. When the multi-page sub-region and the low-frequency sub-region meet corresponding conditions, the number of rows and columns of icons in each sub-region corresponding to the video playback scene is adjusted. For example, sub-region z2 is a multi-page sub-region, sub-region z3 is a low-frequency sub-region, and a previous page-turning frequency of sub-region z2 is greater than the second threshold. Meanwhile, the terminal is displayed in the first mode and the number n1 of columns of icons in sub-region z2 and the number n2 of columns of icons in sub-region z3 are equal (i.e., both are 2). Therefore, the terminal can adjust the number m1 of rows of icons in sub-region z2 and the number m2 of rows of icons in sub-region z3 according to a preset adjustment strategy. In an example, the preset adjustment strategy is to set p to be 1. As such, after adjustment, the number of rows of icons in sub-region z2 is 3 and the number of rows of icons in sub-region z3 is 1.

According to the implementation, sub-regions of different sizes can be provided in different application scenes, such that more corresponding icons can be displayed in the corresponding application scene, reducing page turning operations of the user for sub-regions. Furthermore, the number of rows and columns of icons in the sub-region corresponding to the application scene can also be adjusted according to actual use of the user. The longer the user uses the sidebar, the more the sidebar can adapt to operating habits of the user. Hence, operating steps and time of the user can be saved and efficiency of using by the user in the designated application scene the icon can be improved.

At block 14052, the number of columns of icons in the multi-page sub-region is adjusted to (n1+q) and the number of columns of icons in the low-frequency sub-region is adjusted to (n2−q) when the sidebar is displayed in a second mode and m1=m2.

In the implementation, the second mode is a mode where the sidebar is displayed at the top or bottom of the current user interface.

Figure 17:
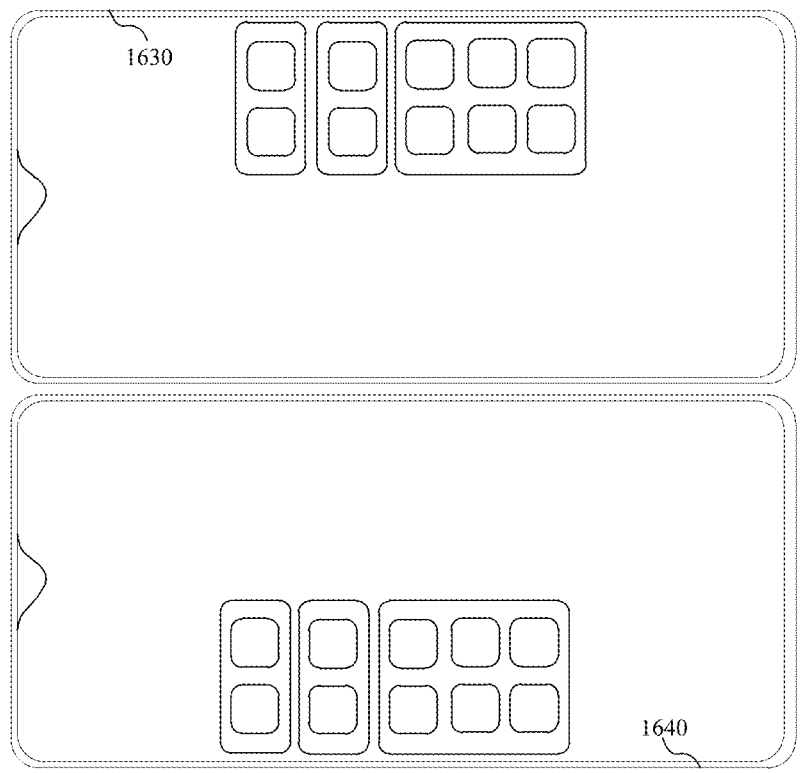
FIG. 17 is a schematic diagram illustrating display of a sidebar when a terminal is in a landscape state according to other implementations of FIG. 14.

Based on the implementation illustrated in FIG. 14, FIG. 17 is a schematic diagram illustrating display of a sidebar when a terminal is in a landscape state according to other implementations. In FIG. 17, the terminal is displayed in the landscape state, and the sidebar is displayed close to a top edge 1630 of the screen or displayed close to a bottom edge 1640 of the screen.

Taking the sidebar illustrated in FIG. 17 as an example, in the implementation, the number of rows and columns of icons in each sub-region can be determined according to the application scene of the foreground application. Furthermore, the number of rows and columns of icons in each sub-region in the sidebar corresponding to one application scene can be adjusted. In an example, the number of rows and columns of icons in each sub-region in the sidebar corresponding to one application scene is adjusted when the terminal starts this application scene.

For example, there are three sub-regions in the sidebar: sub-region z4, sub-region z5, and sub-region z6. In the video playback scene, the number of rows and columns of icons in sub-region z4 is 2 rows and 1 column; the number of rows and columns of icons in sub-region z5 is 2 rows and 2 columns; the number of rows and columns of icons in sub-region z6 is 2 rows and 2 columns. In an example, when the foreground application of the terminal starts a video playback scene, the terminal will display the sidebar according to the number of rows and columns of icons in each sub-region corresponding to the video playback scene.

Based on the above, before determining the number of rows and columns of icons in each sub-region corresponding to the video playback scene, the terminal can make decisions based on the multi-page sub-region and the low-frequency sub-region in the sidebar. When the multi-page sub-region and the low-frequency sub-region meet corresponding conditions, the number of rows and columns of icons in each sub-region corresponding to the video playback scene is adjusted. For example, sub-region z5 is a multi-page sub-region, sub-region z6 is a low-frequency sub-region, and a previous page-turning frequency of sub-region z5 is greater than the second threshold. Meanwhile, the terminal is displayed in the second mode and the number m1 of rows of icons in sub-region z5 and the number m2 of rows of icons in sub-region z6 are equal (i.e., both are 2). Therefore, the terminal can adjust the number n1 of columns of icons in sub-region z5 and the number n2 of columns of icons in sub-region z6 according to a preset adjustment strategy. In an example, the preset adjustment strategy is to set p to be 1. As such, after adjustment, the number of columns of icons in sub-region z5 is 3 and the number of columns of icons in sub-region z6 is 1.

In the above operations, m1, n1, m2, n2, p, and q are natural numbers, m2 is greater than or equal to p, and n2 is greater than or equal to q.

At block 1406, for each sub-region, the size of the sub-region is determined according to the number of rows and columns of icons in the sub-region.

In the implementation, the terminal will determine the size of the sub-region in the sidebar according to the number of rows and columns of icons in the sub-region.

For example, in a video playback scene, for the three sub-regions in the sidebar, the number of rows and columns of icons in sub-region z1 is 1 row and 2 columns; the number of rows and columns of icons in sub-region z2 is 2 rows and 2 columns; the number of rows and columns of icons in sub-region z3 is 2 rows and 2 columns.

In a text reading scene, for the three sub-regions in the sidebar, the number of rows and columns of icons in sub-region z1 is 1 row and 2 columns; the number of rows and columns of icons in sub-region z2 is 1 row and 2 columns; the number of rows and columns of icons in sub-region z3 is 3 rows and 2 columns.

The terminal will determine the size of each sub-region in the sidebar according to the numbers of rows and columns of icons in different sub-regions. The size is used to describe geometric parameters such as the length of each side, the overall shape, and the area of the sub-region.

At block 1407, a position for displaying the sub-region in the sidebar is determined according to the size of the sub-region and a display order of the sub-region.

In the implementation, the display order is an order of displaying of the sub-region in the sidebar in relative to other sub-regions. For example, the sidebar includes 3 regions from top to bottom, used for displaying 3 sub-regions. Each sub-region in the sidebar has its own display order. For example, a sub-region with a display order of 1 needs to be displayed at the top of the sidebar, a sub-region with a display order of 2 needs to be displayed at the center of the sidebar, and sub-region with a display order of 3 needs to be displayed at the bottom of the sidebar.

At block 1408, the sub-region is displayed at the position.

In the implementation, the terminal can display the sub-region at the position.

At block 1409, at least one icon is displayed in the sub-region.

In an implementation manner, the terminal may replace block 1409 with block 14091, block 14092, and block 14093 to implement displaying the sub-region and displaying at least one icon in the sub-region.

At block 14091, the at least one icon contained in a multi-page sub-region is determined when the sub-region is the multi-page sub-region.

In the implementation, when the sub-region is a multi-page sub-region, the terminal determines the at least one icon contained in the multi-page sub-region. There can be at least two icons, the multi-page sub-region contains i pages, and i is a positive integer greater than or equal to 2.

In one implementation manner, the at least one icon contained in the sidebar is at least one of important function controls, shortcut function controls, and startup icons of third-party applications.

In another implementation manner, the at least one icon contained in the sidebar may be an adding control.

At block 14092, for each of the at least one icon contained in the multi-page sub-region, the number of previous use times or a previous use frequency thereof in the application scene is determined.

In the implementation, the terminal determines, for each of the at least one icon contained in the multi-page sub-region, the number of previous use times or the previous use frequency thereof in the application scene of the foreground application.

At block 14093, the at least one icon is arranged from the j-th page to the (j+1)-th page in the multi-page sub-region in a descending order of the numbers of previous use times or the previous use frequencies.

In the implementation, the terminal can arrange the at least one icon from the j-th page to the (j+1)-th page in the multi-page sub-region in a descending order of the numbers of previous use times or the previous use frequencies. j is a positive integer, (j+1) is less than or equal to i, and the j-th page can be a page where the at least one icon is currently arranged. In one sub-region, the terminal can specify priorities of icons per page (in other words, page-based priority), for example, the priority of each icon in the same page is the same. For example, from the first page, the second page, . . . , the (i−1)-th page, to the i-th page, the priorities of the icons in each page can be decreased gradually.

In an implementation manner, the terminal may also specify positions of icons (icon position for short) of different priorities on the same page, and arrange the icons according to the priorities of the icon positions.

Figure 18:
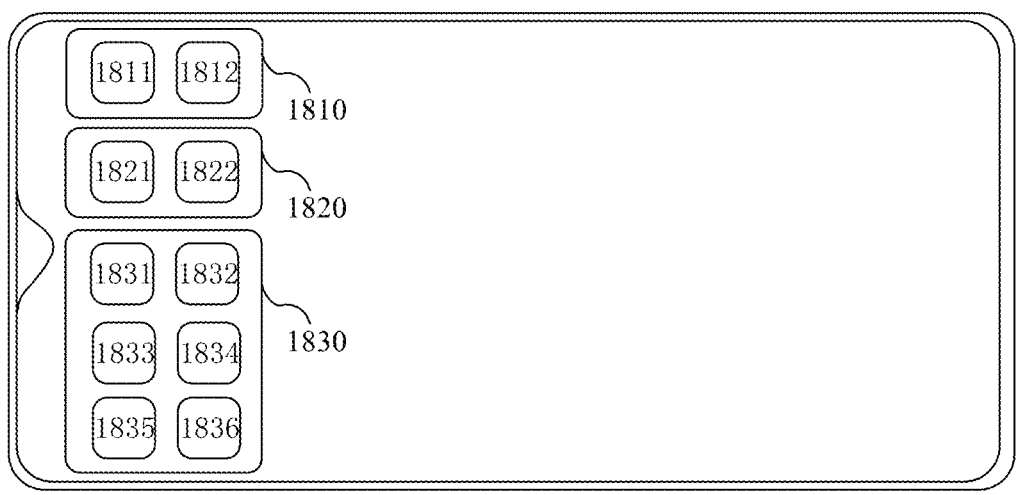
FIG. 18 is a schematic diagram illustrating priorities of positions of icons according to implementations

Based on the implementation illustrated in FIG. 14, FIG. 18 is a schematic diagram illustrating priorities of icon positions according to implementations. As illustrated in FIG. 18, a sub-region 1810, a sub-region 1820, and a sub-region 1830 are displayed in the sidebar. In the sub-region 1810, an icon 1811 and an icon 1812 whose positions cannot be changed are displayed. In the sub-region 1820, the priority of an icon position 1821 is higher than the priority of an icon position 1822. In the sub-region 1830, arranged in a descending order of priorities, are an icon position 1831, an icon position 1832, an icon position 1833, an icon position 1834, an icon position 1835, and an icon position 1836.

In one implementation manner, if the number of icons displayed in the sub-region 1830 is less than 6, the number of pages of the sub-region 1830 is one and the icons are displayed on the one page.

In another implementation manner, if the number of icons displayed in the sub-region 1830 exceeds 6, the terminal displays 6 icons on a first page of the sub-region 1830, and arrange, in other pages, other icons in a descending order of priorities.

In summary, according to the method of the implementation, the terminal can acquire the application identifier of the foreground application after receiving the sidebar display instruction. The terminal can determine the application scene of the foreground application from the scene configuration file according to the application identifier. The terminal can determine the number of rows and columns of icons in each of the at least two sub-regions. The terminal can display at least one icon in each of the at least two sub-regions according to the number of rows and columns of icons in each of the at least two sub-regions. It can be seen that, the terminal can determine the application scene of the foreground application and provide sub-regions of corresponding sizes according to the application scene, to display a corresponding number of icons. In this way, efficiency of using by the user in the designated scene the icons in the designated sub-region can be improved and functions corresponding to the icons can be quickly triggered by the user.

According to the implementation, when there is a multi-page sub-region in the at least two sub-regions in the sidebar, the number of previous page-turning times or the previous page-turning frequency of the multi-page sub-region in the application scene is determined. When the number of previous page-turning times is greater than the first threshold or when the previous page-turning frequency is greater than the second threshold, the low-frequency sub-region is determined from the at least two sub-regions. When the sidebar is displayed in first mode and the number of columns of icons in each sub-region in the sidebar is the same, the number of rows of icons in the low-frequency sub-region page will be reduced and the number of rows reduced will be added to the number of rows of icons in the multi-page sub-region. It can be seen that, the size of the sub-region can be adjusted according to page-turning of the sub-region in the application scene, so that the sub-region whose pages are frequently turned by the user can be adaptively expanded. The longer the user uses the sidebar, the more the sidebar can adapt to operating habits of the user. Hence, operating steps and time of the user can be saved and efficiency of using by the user in the designated application scene the icon can be improved.

Different from the implementation of FIG. 14, the terminal further can determine the number of rows and columns of icons in each of at least two sub-regions according to a type of a foreground application, as detailed below.

Figure 19:
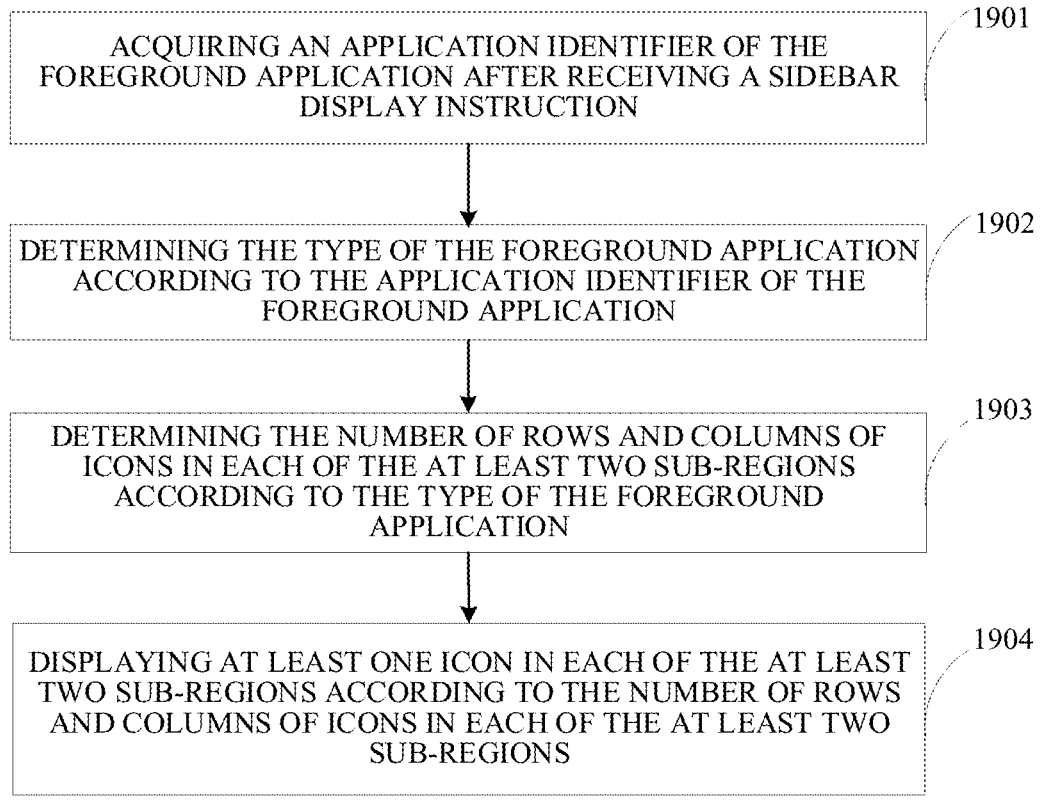
FIG. 19 is a schematic diagram illustrating a method for icon display according to other implementations.

FIG. 19 is a schematic diagram illustrating a method for icon display according to other implementations. The method can be applied to the terminal of any of FIG. 1 to FIG. 9. As illustrated in FIG. 19, the method begins at 1901.

At block 1901, an application identifier of the foreground application is acquired after receiving a sidebar display instruction.

In the implementation, block 1901 is performed in a similar way as block 1401, which is not repeated herein.

At block 1902, the type of the foreground application is determined according to the application identifier of the foreground application.

In the implementation, the terminal can determine the type of the foreground application according to the application identifier of the foreground application. For example, the terminal can determine the type of the foreground application according to a package name (i.e., application identifier) of the foreground application. A correspondence between application identifiers of the foreground application and types of the foreground application may be pre-stored in a terminal. Alternatively, the correspondence may be pre-stored in a server, and the terminal can directly read the correspondence from the server when in need.

At block 1903, the number of rows and columns of icons in each of the at least two sub-regions is determined according to the type of the foreground application.

In the implementation, the terminal can determine the number of rows and columns of icons in each of the at least two sub-regions according to the type of the foreground application.

In an implementation manner, different types of the foreground application correspond to different sizes of sub-regions. Table 3 illustrates a correspondence between types of the foreground application and the numbers of rows and columns of icons in various sub-regions in the sidebar. For example, the sidebar includes three sub-regions: sub-region z1, sub-region z2, and sub-region z3.

TABLE 3

|  | sub-region z1 | sub-region z2 | sub-region z3 |
| --- | --- | --- | --- |
| instant messaging type | 1 row and 2 columns | 1 row and 2 columns | 3 rows and 2 columns |
| video playback type | 1 row and 2 columns | 3 rows and 2 columns | 1 row and 2 columns |
| default type | 1 row and 2 columns | 2 rows and 2 columns | 2 rows and 2 columns |

The terminal determines the type of the foreground application. As illustrated in Table 3, in the case that the type of the foreground application is the instant messaging type, the terminal determines that the numbers of rows and columns of icons in various sub-regions in the sidebar are: sub-region z1 of 1 row and 2 columns, sub-region z2 of 1 row and 2 columns, and sub-region z3 of 3 rows and 2 columns. In the case that the type of the foreground application is the video playback type, the terminal determines that the numbers of rows and columns of icons in each sub-region in the sidebar are: sub-region z1 of 1 row and 2 columns, sub-region z2 of 3 rows and 2 columns, and sub-region z3 of 1 row and 2 columns. In the case that the type of the foreground application is the default type, the terminal determines that the numbers of rows and columns of icons in various sub-regions in the sidebar are: sub-region z1 of 1 row and 2 columns, sub-region z2 of 2 rows and 2 columns, and sub-region z3 of 2 row and 2 columns. If the terminal cannot find a type of the foreground application corresponding to the application identifier of the foreground application from the correspondence between application identifiers of the foreground application and types of the foreground application, the terminal can determine the type of the foreground application as the default type.

Figure 20:
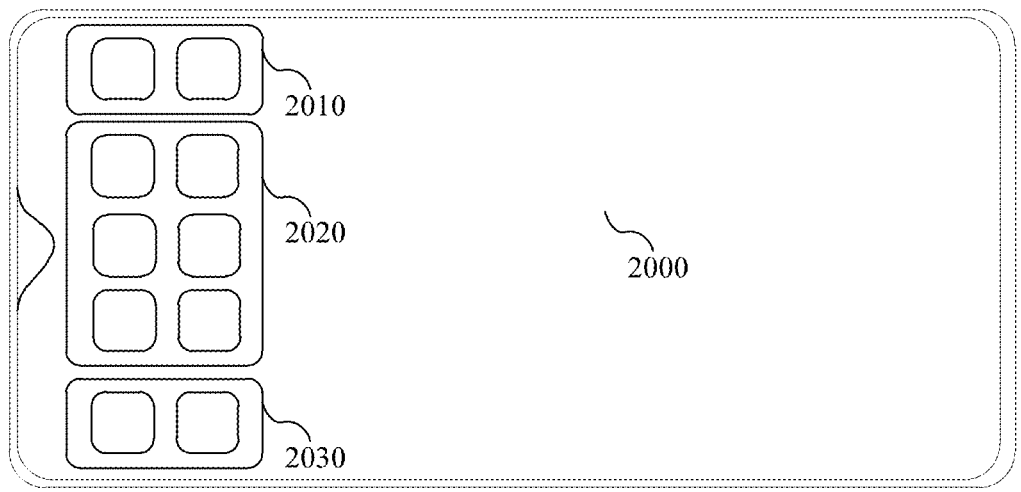
FIG. 20 is a schematic diagram illustrating display of a sidebar corresponding to a foreground application of a video playback type according to implementations of FIG. 19.

Based on the implementation illustrated in FIG. 19, FIG. 20 is a schematic diagram illustrating display of a sidebar corresponding to a foreground application of a video playback type according to implementations. As illustrated in FIG. 20, a current user interface is an interface 2000 of the foreground application of the video playback type. The first sub-region 2010 displays icons with 1 row and 2 columns, the second sub-region 2020 displays icons with 3 rows and 2 columns, and the third sub-region 2030 displays icons with 1 row and 2 columns.

The second sub-region can display shortcut function controls, such as a screenshot function control, a screen recording function control, a translation function control, a voice assistant control, and an accelerated cleaning control. According to the implementation, the above shortcut function controls can be used by the user without turning pages in the second sub-region. As such, the terminal can directly display multiple shortcut function controls when the foreground application is the video playback type, which improves efficiency of the user in using the shortcut function.

Figure 21:
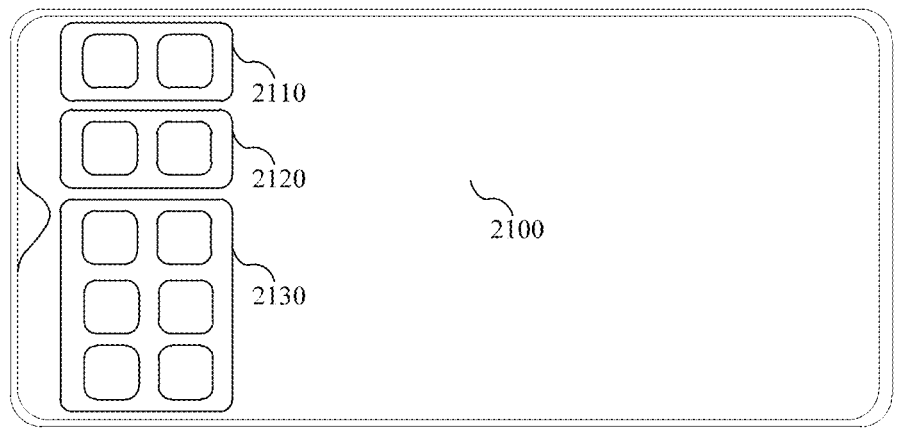
FIG. 21 is a schematic diagram illustrating display of a sidebar corresponding to a foreground application of an instant messaging type according to implementations of FIG. 19.

Based on the implementation illustrated in FIG. 19, FIG. 21 is a schematic diagram illustrating display of a sidebar corresponding to a foreground application of an instant messaging type according to implementations. As illustrated in FIG. 21, a current user interface is an interface 2100 of the foreground application of the instant messaging type. The first sub-region 2110 displays icons with 1 row and 2 columns, the second sub-region 2120 displays icons with 1 row and 2 columns, and the third sub-region 2130 displays icons with 3 rows and 2 columns.

The third sub-region 2130 can display startup icons of third-party applications, such as startup icons of other instant messaging applications, blog applications, and news reading applications. According to the implementation, the startup icons of the third-party applications can be displayed when the foreground application is an instant messaging application. It is possible to facilitate the user to directly switch to the designated third-party application and improve efficiency of switching from the instant messaging application to other applications.

At block 1904, at least one icon is displayed in each of the at least two sub-regions according to the number of rows and columns of icons in each of the at least two sub-regions.

In the implementation, block 1904 is performed in a similar way as block 1330, which is not repeated herein.

In conclusion, according to the method, the application identifier of the foreground application is acquired after receiving the sidebar display instruction. The type of the foreground application is determined according to the application identifier of the foreground application. The number of rows and columns of icons in each of the at least two sub-regions is determined according to the type of the foreground application. The at least one icon is displayed in each of the at least two sub-regions according to the number of rows and columns of icons in each of the at least two sub-regions. Since different types of foreground applications correspond to different sizes of the sub-regions in the sidebar, steps of page switching in the designated sub-region can be reduced and efficiency of the user in using the icons in the sub-region can be improved.

The following are device implementations of this application, which can be used to implement method implementations of this application. For details not disclosed in the device implementations of this application, reference can be made to the method implementations of this application.

Figure 22:
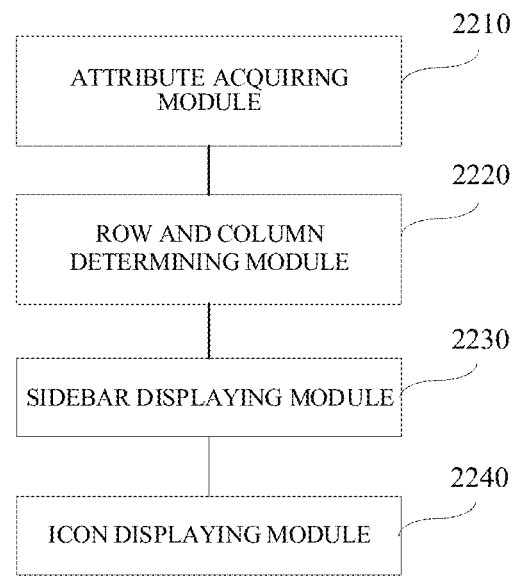
FIG. 22 is a block diagram illustrating a device for icon display according to implementations.

FIG. 22 is a block diagram illustrating a device for icon display according to implementations. The device for icon display can be implemented as all or part of the terminal through software, hardware, or their combination. The device for icon display includes an attribute acquiring module 2210, a row and column determining module 2220, a sidebar displaying module 2230, and an icon displaying module 2240.

The attribute acquiring module 2210 is configured to acquire an attribute of a foreground application after receiving a sidebar display instruction, where the sidebar display instruction is used to instruct a terminal to display a sidebar on a current user interface, the sidebar includes at least two sub-regions, and the attribute of the foreground application includes a type of the foreground application or an application scene of the foreground application.

The row and column determining module 2220 is configured to determine, according to the attribute of the foreground application, the number of rows and columns of icons in each of the at least two sub-regions, where the number of rows and columns of icons is indicative of the number of rows and columns of at least one icon in one page of one sub-region.

The sidebar displaying module 2230 is configured to determine, according to the number of rows and columns of icons in each of the at least two sub-regions, the size of each of the at least two sub-regions in the sidebar.

The icon displaying module 2240 is configured to display at least one icon in each of the at least two sub-regions.

In at least one implementation, the icon displaying module 2240 is configured to, for each sub-region: determine the size of the sub-region according to the number of rows and columns of icons in the sub-region; determine a position for displaying the sub-region in the sidebar according to the size of the sub-region and a display order of the sub-region, where the display order is an order of displaying of the sub-region in the sidebar in relative to other sub-regions; display the sub-region at the position; and display at least one icon in the sub-region.

In at least one implementation, the icon displaying module 2240 is configured to: determine the at least one icon contained in a multi-page sub-region when the sub-region is the multi-page sub-region, where the multi-page sub-region contains i pages and i is a positive integer greater than or equal to 2; for each of the at least one icon contained in the multi-page sub-region, determine the number of previous use times or a previous use frequency thereof in the application scene; and arrange, in the multi-page sub-region, the at least one icon from the j-th page to the (j+1)-th page in a descending order of the numbers of previous use times or the previous use frequencies, where j is a positive integer and (j+1) is less than or equal to i.

In at least one implementation, the row and column determining module 2220 is configured to: determine the number of previous page-turning times or a previous page-turning frequency of a multi-page sub-region in the application scene, when at least one of the at least two sub-regions is the multi-page sub-region, where the number of rows and columns of icons in the multi-page sub-region is m1 rows and n1 columns and one page of a sub-region is displayed at a time; determine a low-frequency sub-region from the at least two sub-regions when the number of previous page-turning times is greater than a first threshold or the previous page-turning frequency is greater than a second threshold, where the number of rows and columns of icons in the low-frequency sub-region is m2 rows and n2 columns; adjust the number of rows of icons in the multi-page sub-region to (m1+p) and adjust the number of rows of icons in the low frequency sub-region to (m2−p) when the sidebar is displayed in a first mode and n1=n2, where the first mode is a mode where the sidebar is displayed on a left or right side of the current user interface; and adjust the number of columns of icons in the multi-page sub-region to (n1+q) and adjust the number of columns of icons in the low-frequency sub-region to (n2−q) when the sidebar is displayed in a second mode and m1=m2, where the second mode is a mode where the sidebar is displayed at the top or bottom of the current user interface, where m1, n1, m2, n2, p, and q are natural numbers, m2 is greater than or equal to p, and n2 is greater than or equal to q.

In at least one implementation, the attribute acquiring module 2210 is configured to acquire an application identifier of the foreground application and to determine the type of the foreground application according to the application identifier of the foreground application, when the attribute of the foreground application includes the type of the foreground application and the sidebar display instruction is received; and the row and column determining module 2220 is configured to determine, according to the type of the foreground application, the number of rows and columns of icons in each of the at least two sub-regions.

In at least one implementation, the attribute acquiring module 2210 is configured to: acquire an application identifier of the foreground application when the attribute of the foreground application includes the application scene of the foreground application and the sidebar display instruction is received; and determine, according to the application identifier of the foreground application, the application scene of the foreground application from a scene configuration file, where the scene configuration file is preset in the terminal or downloaded from a server.

In at least one implementation, the attribute acquiring module is configured to: determine an application running on a focus screen as the foreground application when the terminal is in a split-screen mode; and determine, according to the application identifier of the foreground application, the application scene of the foreground application from the scene configuration file.

In at least one implementation, the attribute acquiring module 2210 is configured to: determine the number k of application scenes corresponding to the foreground application according to the application identifier of the foreground application, where k is a positive integer; determine the application scene corresponding to the foreground application as the application scene of the foreground application, when k is equal to 1; and determine the application scene of the foreground application according to a first application programming interface (API) invoked by the foreground application, when k is greater than or equal to 2.

In at least one implementation, the attribute acquiring module 2210 is configured to: determine an application scene corresponding to the first API according to a scene mapping relationship, where the scene mapping relationship is indicative of a mapping relationship between APIs and application scenes; and determine the application scene corresponding to the first API as the application scene of the foreground application.

Figure 23:
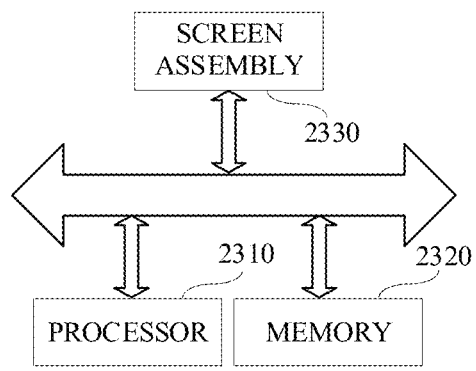
FIG. 23 is a block diagram illustrating a terminal according to implementations.

FIG. 23 is a block diagram illustrating a terminal according to implementations. As illustrated in FIG. 23, the terminal includes a processor 2310 and a memory 2320. The memory 2320 is configured to store at least one instruction. The at least one instruction is loaded and executed by the processor 2310 to implement the method for icon display of any of the above implementations. In an example, the terminal further includes a screen assembly 2330, where the screen assembly 2330 is used to display the user interface of the foreground application and the sidebar.

In at least one implementation, a computer-readable storage medium is provided. The computer-readable storage medium is configured to store at least one instruction. When loaded and executed by a processor, the at least one instruction is configured to implement the method for icon display of any of the above implementations.

In at least one example, a computer program product is also provided. The computer program product is configured to store at least one instruction. When loaded and executed by a processor, the at least one instruction is configured to implement the method for icon display of any of the above implementations.

It should be noted that, for the device for icon display for performing the method for icon display of the foregoing implementations, the division of the foregoing functional modules is merely used for illustration. In practice, the above-mentioned functions can be allocated to different functional modules as required, that is, the internal structure of the device can be divided into different functional modules to complete all or part of the functions described above. In addition, the device implementations and the method implementations of the above belong to the same concept, and the implementation process of the device implementations is detailed in the method implementations, which will not be repeated herein.

The above serial numbers of the implementations are only for description and do not represent advantages and disadvantages of the implementations.

Those of ordinary skill in the art can understand that all or part of the operations for implementing the foregoing implementations can be achieved by hardware, or by a program instructing hardware. The program can be stored in a computer-readable storage medium. The storage medium may be a read-only memory, a magnetic disk, or an optical disk, etc.

The above is some implementations of this application and is not intended to limit this application. Any modification, equivalent substitute, improvement, etc., made within the spirit and principle of this application shall be included in the protection scope of this application.

What is claimed is:

1. A method for icon display, comprising:
acquiring an attribute of a foreground application after receiving a sidebar display instruction, wherein the sidebar display instruction is used to instruct a terminal to display a sidebar on a current user interface, the sidebar comprises at least two sub-regions, and the attribute of the foreground application comprises a type of the foreground application or an application scene of the foreground application;
determining, according to the attribute of the foreground application, a number of rows and columns of icons in each of the at least two sub-regions, wherein the number of rows and columns of icons is indicative of the number of rows and columns of at least one icon in one page of one sub-region; and
displaying at least one icon in each of the at least two sub-regions according to the number of rows and columns of icons in each of the at least two sub-regions;
wherein when the attribute of the foreground application comprises the application scene of the foreground application, determining, according to the attribute of the foreground application, the number of rows and columns of icons in each of the at least two sub-regions comprises:
determining a number of previous page-turning times or a previous page-turning frequency of a multi-page sub-region in the application scene, when at least one of the at least two sub-regions is the multi-page sub-region, wherein the number of rows and columns of icons in the multi-page sub-region is m1 rows and n1 columns and one page of a sub-region is displayed at a time;
determining a low-frequency sub-region from the at least two sub-regions when the number of previous page-turning times is greater than a first threshold or the previous page-turning frequency is greater than a second threshold, wherein the number of rows and columns of icons in the low-frequency sub-region is m2 rows and n2 columns;

adjusting the number of rows of icons in the multi-page sub-region to (m1+p) and adjusting the number of rows of icons in the low frequency sub-region to (m2−p) when the sidebar is displayed in a first mode and n1=n2, wherein the first mode is a mode where the sidebar is displayed on a left or right side of the current user interface; and adjusting the number of columns of icons in the multi-page sub-region to (n1+q) and adjusting the number of columns of icons in the low-frequency sub-region to (n2−q) when the sidebar is displayed in a second mode and m1=m2, wherein the second mode is a mode where the sidebar is displayed at a top or bottom of the current user interface;

wherein m1, n1, m2, n2, p, and q are natural numbers, m2 is greater than or equal to p, and n2 is greater than or equal to q.

2. The method of claim 1, wherein displaying at least one icon in each of the at least two sub-regions according to the number of rows and columns of icons in each of the at least two sub-regions comprises:

for each sub-region,
determining a size of the sub-region according to the number of rows and columns of icons in the sub-region;
determining a position for displaying the sub-region in the sidebar according to the size of the sub-region and a display order of the sub-region, wherein the display order is an order of displaying of the sub-region in the sidebar in relative to other sub-regions;
displaying the sub-region at the position; and
displaying at least one icon in the sub-region.

3. The method of claim 2, wherein displaying the at least one icon in the sub-region comprises:
determining the at least one icon contained in a multi-page sub-region when the sub-region is the multi-page sub-region, wherein the multi-page sub-region contains i pages and i is a positive integer greater than or equal to 2;
for each of the at least one icon contained in the multi-page sub-region, determining the number of previous use times or a previous use frequency thereof in the application scene; and
arranging, in the multi-page sub-region, the at least one icon from a j-th page to a (j+1)-th page in a descending order of the numbers of previous use times or the previous use frequencies, wherein j is a positive integer and (j+1) is less than or equal to i.

4. The method of claim 1, wherein when the attribute of the foreground application comprises the type of the foreground application,
acquiring the attribute of the foreground application after receiving the sidebar display instruction comprises:
acquiring an application identifier of the foreground application after receiving the sidebar display instruction; and
determining the type of the foreground application according to the application identifier of the foreground application; and
determining, according to the attribute of the foreground application, the number of rows and columns of icons in each of the at least two sub-regions comprises:
determining, according to the type of the foreground application, the number of rows and columns of icons in each of the at least two sub-regions.

5. The method of claim 1, wherein when the attribute of the foreground application comprises the application scene of the foreground application, acquiring the attribute of the foreground application after receiving the sidebar display instruction comprises:
acquiring an application identifier of the foreground application after receiving the sidebar display instruction; and
determining, according to the application identifier of the foreground application, the application scene of the foreground application from a scene configuration file, wherein the scene configuration file is preset in the terminal or downloaded from a server.

6. The method of claim 5, wherein determining, according to the application identifier of the foreground application, the application scene of the foreground application from the scene configuration file comprises:
determining an application running on a focus screen as the foreground application when the terminal is in a split-screen mode; and
determining, according to the application identifier of the foreground application, the application scene of the foreground application from the scene configuration file.

7. The method of claim 5, wherein determining, according to the application identifier of the foreground application, the application scene of the foreground application from the scene configuration file comprises:
determining a number k of application scenes corresponding to the foreground application according to the application identifier of the foreground application, wherein k is a positive integer;
determining the application scene corresponding to the foreground application as the application scene of the foreground application, when k is equal to 1; and
determining the application scene of the foreground application according to a first application programming interface (API) invoked by the foreground application, when k is greater than or equal to 2.

8. The method of claim 7, wherein determining the application scene of the foreground application according to the first API invoked by the foreground application comprises:
determining an application scene corresponding to the first API according to a scene mapping relationship, wherein the scene mapping relationship is indicative of a mapping relationship between APIs and application scenes; and
determining the application scene corresponding to the first API as the application scene of the foreground application.

9. A terminal,
comprising: at least one
processor; and
a non-transitory computer readable storage, coupled to the at least one processor and storing at least one computer executable instruction thereon which, when executed by the at least one processor, causes the at least one processor to:
acquire an attribute of a foreground application after receiving a sidebar display instruction, wherein the sidebar display instruction is used to instruct a terminal to display a sidebar on a current user interface, the sidebar comprises at least two sub-regions, and the attribute of the foreground application comprises a type of the foreground application or an application scene of the foreground application;

determine, according to the attribute of the foreground application, a number of rows and columns of icons in each of the at least two sub-regions, wherein the number of rows and columns of icons is indicative of the number of rows and columns of at least one icon in one page of one sub-region;

display at least one icon in each of the at least two sub-regions according to the number of rows and columns of icons in each of the at least two sub-regions;

wherein when the attribute of the foreground application comprises the application scene of the foreground application, the at least one processor configured to determine, according to the attribute of the foreground application, the number of rows and columns of icons in each of the at least two sub-regions is configured to:

determine a number of previous page-turning times or a previous page-turning frequency of a multi-page sub-region in the application scene, when at least one of the at least two sub-regions is the multi-page sub-region, wherein the number of rows and columns of icons in the multi-page sub-region is m1 rows and n1 columns and one page of a sub-region is displayed at a time;

determine a low-frequency sub-region from the at least two sub-regions when the number of previous page-turning times is greater than a first threshold or the previous page-turning frequency is greater than a second threshold, wherein the number of rows and columns of icons in the low-frequency sub-region is m2 rows and n2 columns;

adjust the number of rows of icons in the multi-page sub-region to (m1+p) and adjust the number of rows of icons in the low frequency sub-region to (m2−p) when the sidebar is displayed in a first mode and n1=n2, wherein the first mode is a mode where the sidebar is displayed on a left or right side of the current user interface; and adjust the number of columns of icons in the multi-page sub-region to (n1+q) and adjust the number of columns of icons in the low-frequency sub-region to (n2−q) when the sidebar is displayed in a second mode and m1=m2, wherein the second mode is a mode where the sidebar is displayed at a top or bottom of the current user interface;

wherein m1, n1, m2, n2, p, and q are natural numbers, m2 is greater than or equal to p, and n2 is greater than or equal to q.

10. The terminal of claim 9, wherein the at least one processor configured to display at least one icon in each of the at least two sub-regions according to the number of rows and columns of icons in each of the at least two sub-regions is configured to, for each sub-region:

determine a size of the sub-region according to the number of rows and columns of icons in the sub-region;

determine a position for displaying the sub-region in the sidebar according to the size of the sub-region and a display order of the sub-region, wherein the display order is an order of displaying of the sub-region in the sidebar in relative to other sub-regions;

display the sub-region at the position; and display at least one icon in the sub-region.

11. The terminal of claim 10, wherein the at least one processor configured to display the at least one icon in the sub-region is configured to:

determine the at least one icon contained in a multi-page sub-region when the sub-region is the multi-page sub-region, wherein the multi-page sub-region contains i pages and i is a positive integer greater than or equal to 2;

for each of the at least one icon contained in the multi-page sub-region, determine a number of previous use times or a previous use frequency thereof in the application scene; and arrange, in the multi-page sub-region, the at least one icon from a j-th page to a (j+1)-th page in a descending order of the numbers of previous use times or the previous use frequencies, wherein j is a positive integer and (j+1) is less than or equal to i.

12. The terminal of claim 9, wherein:

the at least one processor configured to acquire the attribute of the foreground application is configured to:

acquire an application identifier of the foreground application and determine the type of the foreground application according to the application identifier of the foreground application, when the attribute of the foreground application comprises the type of the foreground application and the sidebar display instruction is received; and the at least one processor configured to determine, according to the attribute of the foreground application, the number of rows and columns of icons in each of the at least two sub-regions is configured to:

determine, according to the type of the foreground application, the number of rows and columns of icons in each of the at least two sub-regions.

13. The terminal of claim 9, wherein the at least one processor configured to acquire the attribute of the foreground application is configured to:

acquire an application identifier of the foreground application when the attribute of the foreground application comprises the application scene of the foreground application and the sidebar display instruction is received; and determine, according to the application identifier of the foreground application, the application scene of the foreground application from a scene configuration file, wherein the scene configuration file is preset in the terminal or downloaded from a server.

14. The terminal of claim 13, wherein the at least one processor configured to determine, according to the application identifier of the foreground application, the application scene of the foreground application from the scene configuration file is configured to:

determine an application running on a focus screen as the foreground application when the terminal is in a split-screen mode; and determine, according to the application identifier of the foreground application, the application scene of the foreground application from the scene configuration file.

15. The terminal of claim 13, wherein the at least one processor configured to determine, according to the application identifier of the foreground application, the application scene of the foreground application from the scene configuration file is configured to:

determine a number k of application scenes corresponding to the foreground application according to the application identifier of the foreground application, wherein k is a positive integer;

determine the application scene corresponding to the foreground application as the application scene of the foreground application, when k is equal to 1; and determine the application scene of the foreground application according to a first application programming interface (API) invoked by the foreground application, when k is greater than or equal to 2.

16. The terminal of claim 15, wherein the at least one processor configured to determine the application scene of the foreground application according to the first API invoked by the foreground application is configured to:

determine an application scene corresponding to the first API according to a scene mapping relationship, wherein the scene mapping relationship is indicative of a mapping relationship between APIs and application scenes; and determine the application scene corresponding to the first API as the application scene of the foreground application.

17. A non-transitory computer readable storage medium storing a computer program which, when executed by a processor, causes the processor to:

acquire an attribute of a foreground application after receiving a sidebar display instruction, wherein the sidebar display instruction is used to instruct a terminal to display a sidebar on a current user interface, the sidebar comprises at least two sub-regions, and the attribute of the foreground application comprises a type of the foreground application or an application scene of the foreground application;

determine, according to the attribute of the foreground application, a number of rows and columns of icons in each of the at least two sub-regions, wherein the number of rows and columns of icons is indicative of the number of rows and columns of at least one icon in one page of one sub-region;

determine, according to the number of rows and columns of icons in each of the at least two sub-regions, a size of each of the at least two sub-regions in the sidebar; and display at least one icon in each of the at least two sub-regions;

wherein when the attribute of the foreground application comprises the application scene of the foreground application, the computer program executed by the processor to determine, according to the attribute of the foreground application, the number of rows and columns of icons in each of the at least two sub-regions is executed by the processor to:

determine a number of previous page-turning times or a previous page-turning frequency of a multi-page sub-region in the application scene, when at least one of the at least two sub-regions is the multi-page sub-region, wherein the number of rows and columns of icons in the multi-page sub-region is m1 rows and n1 columns and one page of a sub-region is displayed at a time;

determine a low-frequency sub-region from the at least two sub-regions when the number of previous page-turning times is greater than a first threshold or the previous page-turning frequency is greater than a second threshold, wherein the number of rows and columns of icons in the low-frequency sub-region is m2 rows and n2 columns;

adjust the number of rows of icons in the multi-page sub-region to (m1+p) and adjust the number of rows of icons in the low frequency sub-region to (m2−p) when the sidebar is displayed in a first mode and n1=n2, wherein the first mode is a mode where the sidebar is displayed on a left or right side of the current user interface; and adjust the number of columns of icons in the multi-page sub-region to (n1+q) and adjust the number of columns of icons in the low-frequency sub-region to (n2−q) when the sidebar is displayed in a second mode and m1=m2, wherein the second mode is a mode where the sidebar is displayed at a top or bottom of the current user interface;

wherein m1, n1, m2, n2, p, and q are natural numbers, m2 is greater than or equal to p, and n2 is greater than or equal to q.

18. The non-transitory computer readable storage medium of claim 17, wherein the computer program executed by the processor to display at least one icon in each of the at least two sub-regions is executed by the processor to, for each sub-region:

determine a position for displaying the sub-region in the sidebar according to the size of the sub-region and a display order of the sub-region, wherein the display order is an order of displaying of the sub-region in the sidebar in relative to other sub-regions;

display the sub-region at the position; and display at least one icon in the sub-region.

* * * * *